US012730575B2

(12) United States Patent
Kankani et al.

(10) Patent No.: US 12,730,575 B2
(45) Date of Patent: Sep. 8, 2026

(54) SYSTEMS AND METHODS FOR IMPROVING THE PERFORMANCE OF COMPUTING SYSTEMS

(71) Applicant: Uber Technologies, Inc., San Francisco, CA (US)

(72) Inventors: Navneeth Kankani, Fremont, CA (US); Mingmin Chen, Foster City, CA (US); Kevin Cheng, Palo Alto, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 0 days.

(21) Appl. No.: 18/912,116

(22) Filed: Oct. 10, 2024

(65) Prior Publication Data

US 2025/0053323 A1 Feb. 13, 2025

Related U.S. Application Data

(63) Continuation of application No. 18/305,134, filed on Apr. 21, 2023, now Pat. No. 12,141,458.

(51) Int. Cl.
*G06F 3/06* (2006.01)
*H04L 67/00* (2022.01)

(52) U.S. Cl.
CPC ............ *G06F 3/064* (2013.01); *G06F 3/0613* (2013.01); *G06F 3/067* (2013.01); *H04L 67/34* (2013.01)

(58) Field of Classification Search
CPC ....... G06F 3/064; G06F 3/0613; G06F 3/0683
See application file for complete search history.

(56) References Cited

U.S. PATENT DOCUMENTS

| | | | | |
|---|---|---|---|---|
| 9,569,118 | B2 * | 2/2017 | Camp | G06F 3/0656 |
| 11,061,835 | B1 | 7/2021 | Chen | |
| 11,106,393 | B2 * | 8/2021 | Frolikov | G06F 13/18 |
| 12,141,458 | B1 * | 11/2024 | Kankani | G06F 3/067 |
| 2011/0197027 | A1 | 8/2011 | Balasubramanian | |
| 2017/0160983 | A1 | 6/2017 | Fiske | |
| 2017/0223107 | A1 | 8/2017 | Ben Dayan | |
| 2018/0129443 | A1 | 5/2018 | Karve | |
| 2018/0314423 | A1 | 11/2018 | Gong | |
| 2019/0243557 | A1 * | 8/2019 | Joshi | G06F 3/0647 |
| 2019/0250819 | A1 * | 8/2019 | Jain | G06F 3/061 |
| 2019/0339903 | A1 | 11/2019 | Ainscow | |
| 2019/0384521 | A1 | 12/2019 | Patel | |
| 2022/0035574 | A1 * | 2/2022 | Cain | G06F 3/0604 |
| 2022/0043594 | A1 * | 2/2022 | Idicula | G06F 3/0683 |
| 2022/0382477 | A1 * | 12/2022 | Wei | G06F 3/0611 |

* cited by examiner

*Primary Examiner* — Edward J Dudek, Jr.
(74) *Attorney, Agent, or Firm* — Dority & Manning, P.A.

(57) ABSTRACT

Systems and methods for improving inbound/outbound prioritization and processing for large blob workloads. The system can receive latency profiles and determine parameters that control movement of data across data tiers. The method includes receiving a plurality of commands to interact with data. The method includes detecting conditions that fail to satisfy at least one latency profile. The method includes adjusting parameters based on detecting the conditions. Adjusting the parameters adjusts a percentage of data being classified in a first tier to being reclassified in a second tier to satisfy the latency profiles. The method includes processing the plurality of commands based on the adjusted percentage of data.

20 Claims, 8 Drawing Sheets

SYSTEMS AND METHODS FOR IMPROVING THE PERFORMANCE OF COMPUTING SYSTEMS

PRIORITY CLAIM

The present application is a continuation of U.S. Non-Provisional patent application Ser. No. 18/305,134, filed on Apr. 21, 2023, which is incorporated by reference herein.

FIELD

The present disclosure generally relates to using machine-learned models to improve the processing of inbound and outbound computing operations.

BACKGROUND

Application storage provides a storage backend for systems and applications that utilize shared storage or include large storage requirements. For instance, systems or applications which handle high volume data may store data in a shared storage system. The storage system may include redundancy and replication to ensure the availability of the data. For instance, the storage system may include resilient storage to ensure the availability of the data in the event of a storage outage in the primary region.

SUMMARY

Aspects and advantages of embodiments of the present disclosure will be set forth in part in the following description, or may be learned from the description, or may be learned through practice of the embodiments.

In an example aspect, the present disclosure provides an example computer-implemented method. The example computer-implemented method includes receiving a plurality of latency profiles, the plurality of latency profiles indicative of a priority of commands executable by a computing system. The example computer-implemented method includes determining, based on the plurality of latency profiles, one or more parameters, the one or more parameters indicative of a percentage of data movement across a plurality of data tiers. The example computer-implemented method includes receiving a plurality of commands to interact with data stored in the computing system. The example computer-implemented method includes detecting one or more conditions that fail to satisfy at least one latency profile of the plurality of latency profiles. The example computer-implemented method includes adjusting at least one parameter of the one or more parameters based on the one or more conditions, wherein adjusting the at least one parameter adjusts the percentage of data movement across the plurality of data tiers to satisfy the plurality of latency profiles. The example computer-implemented method includes processing the plurality of commands based on the adjusted percentage of data movement across the plurality of data tiers.

In some implementations, the plurality of data tiers includes at least one of: (i) a cold tier, (ii) a warm tier, or (iii) a hot tier.

In some implementations, the one or more parameters is associated with one or more data movement policies. In some implementations, the one or more data movement policies is indicative of a data movement configuration for the plurality of data tiers.

In some implementations, determining one or more conditions includes determining an age associated with a data block, the age indicative of a most recent command to interact with the data block.

In some implementations, the data block comprises the data stored in the computing system.

In some implementations, the method includes determining a default value for the one or more parameters, wherein the default value for the one or more parameters satisfies the plurality of latency profiles.

In some implementations, the method includes determining a count of queue depths issued in a threshold time interval is below a queue depth parameter associated with the plurality of latency profiles. In some implementations, the method includes adjusting the queue depth parameter, based on determining the count of queue depths is below the queue depth parameter.

In some implementations, the count of queue depths is indicative of a number of commands that may be executed in parallel by the computing system.

In some implementations, the plurality of latency profiles are associated with a remote computing system. In some implementations, the remote computing system transmits the commands executable by the computing system.

In some implementations, the plurality of data tiers are associated with a respective computing resource. In some implementations, the respective computing resource indicative of at least one of (i) a level of operations per second, and (ii) a throughput level.

In another aspect, the present disclosure provides an example computing system. The example computing system includes one or more processors and one or more non-transitory, computer readable medium storing instructions that are executable by the one or more processors to cause the computing system to perform operations. The example operations include receiving a plurality of latency profiles, the plurality of latency profiles indicative of a priority of commands executable by a computing system. The example operations include determining, based on the plurality of latency profiles, one or more parameters, the one or more parameters indicative of a percentage of data movement across a plurality of data tiers. The example operations include receiving a plurality of commands to interact with data stored in the computing system. The example operations include detecting one or more conditions that fail to satisfy at least one latency profile of the plurality of latency profiles. The example operations include adjusting at least one parameter of the one or more parameters based on detecting the one or more conditions, wherein adjusting the at least one parameter adjusts a percentage of data being classified in a first tier of the plurality of data tiers to being reclassified in a second tier of the plurality of data tiers to satisfy the plurality of latency profiles. The example operations include processing the plurality of commands based on the adjusted percentage of data.

In some examples, the plurality of data tiers comprises at least one of: (i) a cold tier, (ii) a warm tier, or (iii) a hot tier.

In some examples, the one or more parameters is associated with one or more data movement policies. In some examples, the one or more data movement policies are indicative of a data movement configuration for the plurality of data tiers.

In some example operations, determining one or more conditions includes determining an age associated with a data block, the age indicative of a most recent command to interact with the data block.

In some examples, the data block comprises the data stored in the computing system.

In some examples the operations include determining a default value for the one or more parameters, wherein the default value for the one or more parameters satisfies the plurality of latency profiles.

In some examples, the operations include determining a count of queue depths issued in a threshold time interval is below a queue depth parameter associated with the plurality of latency profiles. In some examples, the operations include adjusting the queue depth parameter, based on determining the count of queue depths is below the queue depth parameter.

In some examples, the count of queue depths is indicative of a number of commands that may be executed in parallel by the computing system.

In some examples, the plurality of latency profiles are associated with a remote computing system. In some examples, the remote computing system transmits the commands executable by the computing system.

In another example aspect, the present disclosure provides for one or more example non-transitory computer-readable media storing instructions that are executable to cause one or more processors to perform operations. The example operations include receiving a plurality of latency profiles, the plurality of latency profiles indicative of a priority of commands executable by a computing system. The example operations include determining, based on the plurality of latency profiles, one or more parameters, the one or more parameters indicative of a percentage of data movement across a plurality of data tiers. The example operations include receiving a plurality of commands to interact with data stored in the computing system. The example operations include detecting one or more conditions that fail to satisfy at least one latency profile of the plurality of latency profiles. The example operations include adjusting at least one parameter of the one or more parameters based on detecting the one or more conditions, wherein adjusting the at least one parameter adjusts a percentage of data being classified in a first tier of the plurality of data tiers to being reclassified in a second tier of the plurality of data tiers to satisfy the plurality of latency profiles. The example operations include processing the plurality of commands based on the adjusted percentage of data.

Other example aspects of the present disclosure are directed to other systems, methods, apparatuses, tangible non-transitory computer-readable media, and devices for performing functions described herein. These and other features, aspects and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
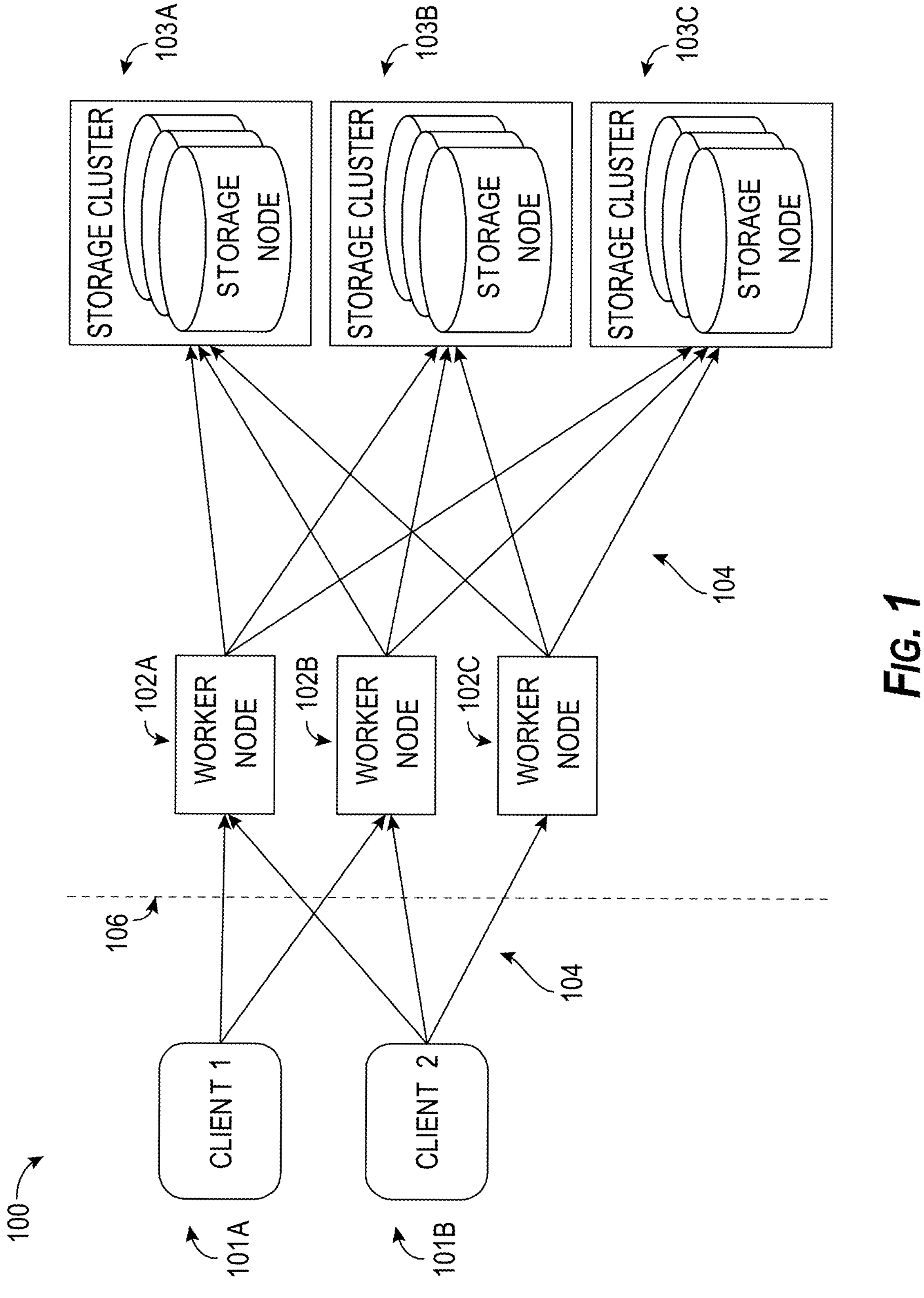
FIG. 1 depicts an example computing ecosystem according to example aspects of the present disclosure.

Generally, the present disclosure is directed to techniques for improving the input and output processing of a storage system. Techniques according to the present disclosure provide improved latency control and input/output operations per second (IOPS) using a data tiering model based on latency profiles and data movement policies. The data tiering model may receive the latency profiles and determine data movement policies to move data across a plurality of data tiers to control latency and improve IOPS. The data tiering model may automatically update parameters of the data movement policy such that the latency profiles are maintained when conditions are detected that may decrease IOPS or increase latency beyond the thresholds defined by the latency profiles.

For example, applications, microservices, or other computer processes may interact with a storage system (e.g., a hard disk drive (HDD)) to perform operations. The storage system may store data needed for an application or computer process to execute properly. Example interactions between the computer process and storage system may include reading, writing, or storing operations that store, access, or interact with data in the storage system.

The storage system may improve the efficiency of computing resources by organizing data into data tiers which provide sufficient resources for facilitating timely interactions with computer processes. Example data tiers may include hot, warm, cold, and archival data tiers. Data tiers may organize processing resources and data using data clusters to assign data to a data tier based on its age (e.g., the latest time the data was accessed) or its frequency (e.g., number of times the data was accessed). For instance, the most recent data or most frequently accessed data may include mission-critical or highly sensitive files and may be assigned to a hot tier. Nodes in a hot tier may include fast processors to facilitate instant retrieval by processing inbound or outbound operations (e.g., IOPS) with low latency (e.g., 50 milliseconds or less).

The storage system may move data which requires high availability but may not require instant retrieval to a warm tier because the data is being accessed less frequently. For example, a warm data tier may be assigned data from recent weeks which is less likely to be requested than data from the current day. Nodes in a warm tier may include slightly slower processors than processors in the hot tier due to the lower demand of the data and will produce a higher latency than the hot tier.

Data that is only periodically accessed may be assigned to a cold tier. As such, nodes in a cold tier may include slower processors than nodes in hot and warm tiers and produce a higher latency than hot and warm tiers. The storage system may also assign data in an archival tier when the data is no longer being accessed or being accessed on rare occasions.

As requests for data are processed, data may move across the data tiers and experience latency changes based on the assigned data tier. Latency is the measure of time it takes for data to move from one point on a network to another. For example, data stored in the hot tier may have a lower latency and data may be accessed more quickly due to the faster processors that process inbound and outbound operations more quickly than data stored in warm or cold data tiers.

The storage system may include a data tiering model configured to orchestrate the movement of data across the data tiers. For example, the data tiering model may receive latency profiles from an application or computing process. Latency profiles may indicate latency requirements for data stored in the storage system. The data tiering model may process the latency profiles and produce data movement policies by determining parameters for the data tiers. The parameters may indicate a percentage of data that should move across the data tiers to prevent IOPS from decreasing and the latency from increasing beyond the specified latency requirements for respective data tiers. In some examples, the parameters may be implemented as data policies (e.g., instructions for how data is handled) that orchestrate the movement of data across the data tiers within the storage system. The parameters may be based on factors such as the data age or frequency, capacity of the tier, workload statistics (e.g., count of commands), or count of queue depths.

As the storage system receives commands from computing processes, the data tiering model may receive performance statistics of the storage system and adjust the parameters of the data movement policies when the performance of the storage system reaches or fails to reach a threshold. For example, the data tiering model may detect a factor such as the count of queue depths issued in a threshold time interval. Queue depths determine the number of commands that may be executed in parallel (e.g., IOPS) by the storage system. In some examples, the data tiering model may determine the count of queue depths is above a threshold for a hot tier and negatively impacting latency. The data tiering model may adjust the parameters of the data tiers to move a greater percentage of data to the warm tier to allow a decrease of queue depth count for the hot tier reducing latency for the hot tier. In some examples, the data tiering model may determine the count of queue depths is below a threshold for the hot tier and determine IOPS may be increased by processing more commands using the hot tier. The data tiering model may adjust the parameters to increase the movement of data from the warm tier to the hot tier to cause a decrease in latency and an increase in IOPS. The data tiering model may actively monitor and adjust the parameters of the data movement policies to ensure the integrity of the latency profiles is maintained.

The technology of the present disclosure may provide a number of benefits and technical effects. For instance, the technology of the present disclosure may integrate customized latency requirements for respective computer processes into to the storage system using the latency profiles which allow for tailored performance and response time for critical application processes. As such the technology may increase the flexibility of the storage system by allowing respective computer processes to define specific latency needs without impacting other computer processes interacting with the same data. The technology of the present disclosure may also help to increase the efficiency and management of storage systems without impacting performance due to the dynamic adjustment of the parameters. Moreover, by detecting conditions that may impact computing efficiency (e.g., processing, resources, etc.) for the storage system and making adjustments, the technology of the present disclosure may improve the IOPS and maintain latency requirements by maximizing the full capacity of the storage system.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations may be made to the embodiments without departing from the scope of the present disclosure. For instance, features illustrated or described as part of one embodiment may be used with another embodiment to yield a still further embodiment. Thus, it is intended that aspects of the present disclosure cover such modifications and variations.

For example, the following describes the technology of this disclosure within the context of a hard drive disk (HDD) storage system for example purposes only. As described herein, the technology described herein is not limited to an HDD storage system and may be implemented for or within any storage system.

FIG. 1 depicts an example computing ecosystem according to example aspects of the present disclosure. The example system 100 may include one or more clients 101A, 101B, worker nodes 102A, 102B, 102C, and storage clusters 103A, 103B, 103C associated with the one or more worker nodes 102A, 102B, 102C. In some examples, the clients 101A, 101B may interact with the worker nodes 102A, 102B, 102C. For instance, the clients 101A, 101B may transmit requests 104 through an API gateway 106 to interact with data stored in the storage clusters 103A, 103B, 103C. For example, the worker nodes 102A, 102B, 102C may receive the requests 104 from the API gateway 106 and facilitate the processing of the requests 104 by directing the request 104 to the correct storage clusters 103A, 103B, 103C for processing.

With respect to examples as described herein, the system 100 may be implemented on a server, on a combination of servers, or on a distributed set of computing devices which communicate over a network such as the Internet. For example, the system 100 may be distributed using one or more physical servers, virtual private servers, containers, cloud computing, etc. In some examples, the system 100 may be implemented as a part of or in connection with the clients 101A, 101B, where, for example, the clients 101A, 101B may be a mobile application client, web browsing client, or desktop application client deployed on a remote computing device that accesses one or more microservices of an application via a client-server relationship. A microservice may include one or more applications architected into independent services (e.g., microservices) that communicate over APIs (application programming interfaces). The clients 101A, 101B may include computer hardware or software which accesses a service (e.g., microservice) for one or more applications or systems. For instance, the clients 101A, 101B may be included in a client-server relationship in which the server allows the clients 101A, 101B to access the service by way of a network (e.g., the internet). In some examples, the clients 101A, 101B may transmit requests 104 to interact with microservices over the network.

In some examples, the system 100 may include a gateway to facilitate requests 104 from clients 101A, 101B to microservices. For instance, the system may include an API gateway 106 which serves as a single entryway for client 101A, 101B interactions with microservices. The API gateway 106 may include a software application between one or more clients (e.g., clients 101A, 101B) and a set of backend microservices. In some examples, the API gateway 106 serves as a reverse proxy to accept API calls from the client applications (e.g., clients 101A, 101B). In some examples, the API gate way 106 may forward the requests (e.g., requests 104) to the appropriate microservice. In some examples, the API gateway 106 may be deployed on server within a shared network associated with the worker nodes 102A, 102B, 102C and storage nodes 103A, 103B, 103C. For instance, the API gateway 106 may be deployed on one or more servers within the shared network which receives inbound traffic and proxy outbound traffic for the worker nodes 102A, 102B, 102C and storage nodes 103A, 103B, 103C.

In some examples, the clients 101A, 101B may transmit requests 104 to interact with one or more backend microservices or applications. In some examples, the request 104 may be an API request. For instance, the request 104 may include a GET, POST, PUT, DELETE, or BATCH function. The GET, POST, PUT, DELETE, or BATCH function may perform operations on data from respective microservices. For instance, a GET request may retrieve data, a POST request may publish data, or a DELETE request may delete data for a respective microservice, etc. In some examples, the web server (e.g., server within the client server relationship) may use an API to facilitate the request 104 to the API gateway 106. By way of example, the API gateway 106 may receive the request 104 and proxy or route the request 104 to the appropriate microservice. In some examples, the microservices may be associated within one or more worker nodes 102A, 102B, 102C. For instance, the microservices may run on the worker nodes 102A, 102B, 102C. In some examples, worker nodes 102A, 102B, 102C may receive the requests 102 and direct the request 104 to one or more storage clusters 103A, 103B, 103C where data associated with the microservices may be stored.

In some examples, the system 100 may be implemented using one or more containers (e.g., standalone software package for a software application) using a container service, or on VMs (virtual machines) within a shared network. A container service may be a cloud service that allows developers to upload, organize, run, scale, manage, and stop containers using container-based virtualization to orchestrate their respective actions. A VM may include virtual computing resources which are not limited to a physical computing device. For example, the worker nodes 102A, 102B, 102C may be deployed in containers controlled by a container orchestration service. In some examples, the container orchestration service may manage the computing resources of worker nodes 102A, 102B, 102C. For instance, the worker nodes 102A, 102B, 102C (e.g., microservices) may be included in a single application or system. By way of example, the container orchestration service may determine the requests 104 from clients will exceed the computing resource capacity of the worker nodes 102A, 102B, 102C and automatically scale the number of microservice instances (e.g., worker nodes 102A, 102B, 102C) based on traffic or resource utilization.

In some examples, the storage clusters 103A, 103B, 103C may be deployed using an orchestration service. For instance, the storage clusters 103A, 103B, 103C may be included in a clustered file system. The clustered file system may be software which manages (e.g., orchestrates) one or more storage clusters 103A, 103B, 103C. In some examples, storage clusters 103A, 103B, 103C may support the storage nodes. For example, the storage clusters 103A, 103B, 103C may include a group of storage nodes. In some examples, the storage clusters 103A, 103B, 103C including the group of storage nodes may function as a storage unit. By way of examples, a storage cluster 103A, 103B, 103C may include three storage nodes and the storage clusters 103A, 103B, 103C may be accessible by a microservice as a single storage unit. In some examples, data may be stored across the storage nodes of the storage clusters 103A, 103B, 103C and can be accessed as block storage (e.g., blocks of data stored across the storage nodes of the storage clusters 103A, 103B, 103C). For instance, the storage nodes may include a physical server with one or more HDDs (hard-disk drives) or SDD (solid-state drives). An HDD may include a storage device which may store data in the event of power loss to the storage device. An SDD may include a storage device which may always require power to store data. In some examples, the storage clusters 103A, 103B, 103C may include a controller (e.g., master) storage node which manages the storage nodes within the storage clusters 103A, 103B, 103C. For instance, the orchestration service may be deployed on a controller node within the storage clusters 103A, 103B, 103C to orchestrate the management of storage nodes. In some examples, the orchestration service may be deployed on a separate server independent from the storage nodes. An example of a storage cluster 103A, 103B, 103C orchestration is further described with reference to FIG. 2

Returning to FIG. 1, the worker nodes 102A, 102B, 102C may receive the requests 104 from the API gateway 106 and direct the requests 104 to the storage clusters 103A, 103B, 103C to interact with the specified data and return a response. In some examples, the storage clusters 103A, 103B, 103C may receive the requests and execute the requests 104 in sequential order (e.g., order received). In some examples, the storage clusters 103A, 103B, 103C may receive the requests 104 and execute the requests 104 in a prioritized manner. For instance, the microservices may provide information which may be utilized by the storage clusters 103A, 103B, 103C to identify a priority of requests. An example of microservices providing information indicative of a priority of requests 104 is further described with reference to FIGS. 4-5.

In some examples, the storage clusters 103A, 103B, 103C may receive the requests 104 and perform the specified function based on storage or computing resources. For instance, the storage nodes within the storage clusters 103A, 103B, 103C may be associated with data tiers. Data tiers may control the servers (e.g., storage nodes) where data is stored. In some examples, data tiers may be associated with respective storage nodes within a storage cluster 103A, 103B, 103C. In some examples, data tiers may be associated with an entire storage cluster 103A, 103B, 103C. For instance, the orchestration service may implement data tiers across a plurality of storage clusters 103A, 103B, 103C. In some examples, data tiers may be implemented by a controller node within a storage cluster 103A, 103B, 103C. An example of data tiers is further described with reference to FIG. 3.

In some examples, respective storage nodes within a storage cluster 103A, 103B, 103C may include varying storage and processing capabilities. By way of example, storage node 1 in storage cluster 103A may include more limited storage capacity and faster processors to instantly process requests 104 for data while storage node 2 in storage cluster 103A may include additional storage capacity and slightly slower processors to retrieve data slightly slower. In some examples, respective server node 1 and server node 2 may be indicative of a data tier. In some examples, data which requires faster or more frequent responses may be assigned to a sever node which meets the requirements.

By way of example, worker node 1 may receive four hundred requests 104 in an hour from client 101B for data x in a storage cluster 103A. In some examples, the increased frequency of requests 104 from client 101B for data x may indicate that the data is critical and should be processed by storage node 1 which includes the fastest processors within the storage cluster 103A to process the critical requests 104 more quickly. In some examples, storage node 1 may be associated with a data tier which includes the fastest processors (e.g., hot data tier) within the storage cluster 103A. In some examples, the client 101B may significantly decrease the frequency of requests 104 for data x to four requests per hour and increase the frequency of requests 104 for data y to five hundred requests per hour. In some examples, the decrease in demand for data x and increase in demand for data may indicate that storage node 1 should now process requests 104 for data y and storages nodes 2 or storage node 3 should process requests 104 for data x to align the faster processors within the storage cluster 103A to the more critical data. For instance, storage nodes 2 and storage nodes 3 may be associated with data tiers (e.g., warm, cold, etc.) that include slower processors than storage node 1. An example of moving data across data tiers is further described with reference to FIGS. 3-4.

In some examples, the storage clusters 103A, 103B, 103C may receive the request 104 and return a result. For instance, the storage clusters 103A, 103B, 103C may perform commands which satisfy functions included in the request 104 and return a result. The result may be received by the worker nodes 102A, 102B, 102C and proxied through the API gateway 106 to the clients 101A, 101B. For instance, the web server associated with the client 101A, 101B may receive the result of the API request (e.g., request 104) and provide the result to the client 101A, 101B. In some examples, the result may update a user interface associated with the client 101A, 101B. For instance, the a remote computing device associated with the client may include a user interface element which displays user interface elements associated with the client 101A, 101B. In some examples, the iterative process of clients 101A, 101B interacting with microservices (e.g., worker nodes) and storage clusters 103A, 103B, 103C may continue as a user interacts with the clients 101A, 101B on the remote computing device.

Figure 2:
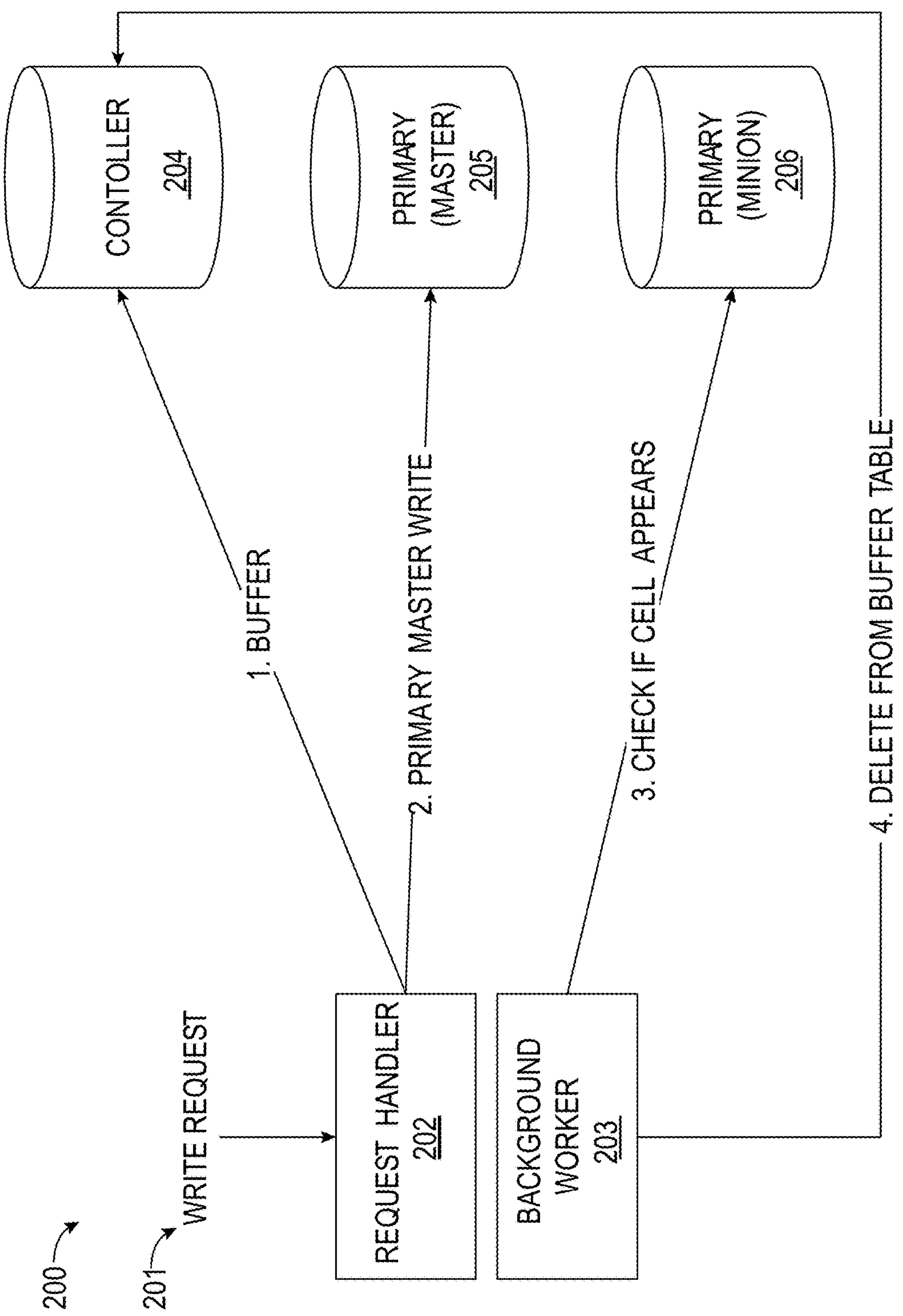
FIG. 2 depicts an example data flow pipeline according to example aspects of the present disclosure.

FIG. 2 depicts an example dataflow pipeline according to example aspects of the present disclosure. The following description of data pipeline 200 is described within an example implementation in which a storage cluster (e.g., storage clusters 103A, 103B, 103C) receives a request 104 and processes the request 104 using a plurality of storage nodes. Additionally, or alternatively, one or more portions of the data plow pipeline 200 may be implemented by an orchestration service across a plurality of storage clusters 103A, 103B, 103C within a storage system.

In some implementations, the worker nodes 102A, 102B, 102C may receive a request 104 from one or more clients 101A, 101B to interact with data stored across one or more storage clusters 103A, 103B, 103C. In some implementations, an API gateway 106 may proxy or route the requests 104 to respective worker nodes 102A, 102B, 102C and the worker nodes 102A, 102B, 102C may direct the requests 104 to the respective storage cluster 103A, 103B, 103C which may include the data block specified in the request 104. In some examples, the requests 104 may include a series of functions (e.g., commands) to interact with one or more data blocks across one or more storage clusters 103A, 103B, 103C.

By way of example, the worker nodes 102A, 102B, 102C may receive the requests 104 and determine the request 104 includes three PUT functions for data received by the client 101A, 101B. In some examples, the worker nodes 102A, 102B, 102C may direct the request 104 to a single storage cluster 103A, 103B, 103C which includes the location of a data block where the three PUT requests may publish data. In some examples, the worker nodes 102A, 102B, 102C may split the request 104 into multiple requests 104. For instance, the data block where the PUT request may be stored may be distributed across multiple storage clusters 103A, 103B, 103C. In some examples, the requests 104 may be distributed across the plurality of respective storage clusters 103A, 103B, 103C which include the data blocks for the respective PUT requests included in the request 104.

By way of example, data pipeline 200 includes a write command 201 to write data to a data block within a storage cluster 103A, 103B, 103C. In some examples, write command 201 may be associated with a PUT function, a POST function, or a BATCH function within a request 104. For instance, a PUT or POST function may include a function which creates a new data record or updates an existing data record within a storage system. In some examples, a BATCH function may include a batch script to create a series of new data records or update a series of existing data records within a storage system. In some examples, the write command 201 may be generated to satisfy the request 104. For instance, the write command 201 may satisfy the function within the request 104 by performing the function (e.g., writing data) and returning a response.

For instance, the worker nodes 102A, 102B, 102C may receive a request 104 including a function that when executed, generates one or more commands (e.g., write command 201) that satisfies the functions within the request 104 and returns a response. In some examples, a write command 201 may include a command to write (e.g., publish, update, etc.) data to a data block within the storage cluster 103A, 103B, 103C and a request to return a response. In some examples, the request to return a response may include a request for confirmation that the command to write data has been completed. In some examples, the response may indicate the location where the data was written (e.g., stored, updated, etc.). In some examples, the write command 201 may write the data to HDD storage or SDD storage. In some examples, the write request may write data to both HDD and SDD storage. For instance, writing data to both HDD and SDD may allow for the data to be accessed quickly and also reliably stored.

In some examples, the worker nodes 102A, 102B, 102C may include a request handler 202. The request handler 202 may include software deployed to the worker nodes 102A, 102B, 102C. For instance, the request handler 202 may be software running on a server of the worker nodes 102A, 102B, 102C. In some examples, the request handler 202 may receive the requests 104 and direct one or more commands (e.g., write commands 201) to the respective storage cluster 103A, 103B, 103C to execute the one or more commands contained in the request 104. For instance, the request handler 202 may handle client 101A, 101B requests 104.

By way of example, the request handler 201 within the worker nodes 102A, 102B, 102C may receive the requests 104 to interact with data stored across one or more storage clusters 103A, 103B, 103C. The request 104 may include a PUT, POST, or BATCH function. In some examples, the worker nodes 102A, 102B, 102C may execute the included function by directing write commands 201 to the respective storage clusters 103A, 103B, 103C where the data may be written. In some examples, the write command 201 may include a request for a response. For example, the request 104 may include functions that are associated with a route. In some examples, the response may be executed a background worker 203. In some examples, the route may be a path from one location on a network to another location. For instance, the route may indicate a path from the location of data associated with the microservice for which the request 104 was generated with the location of the data block where the data will be stored (e.g., written). In some examples, the response may indicate the a route such that future requests 104 to update or retrieve the data stored within a data block may be determined. For instance, the response may indicate a route for future requests 104. In other examples, the response may indicate that the write command 201 has been completed. In some examples, the request handler 201 may execute the function within the request, generate the write command 201 and direct the write command 201 to the respective storage clusters 103A, 103B, 103C.

Returning to FIG. 2, the request handler 202 may direct the write command 201 to a controller node 204 within a storage cluster 103A, 103B, 103C. The controller node 204 may include the orchestration service which manages the computing resources and storage capacity of the storage nodes across a storage cluster 103A, 103B, 103C. In some examples, the controller node 204 may collect performance data indicative of the performance of the storage cluster 103A, 103B, 103C. For instance, the controller node 204 may indicate the processing and storage capacity of respective nodes within the storage cluster 103A, 103B, 103C. In some examples, the controller node 204 may transmit the performance data to a storage monitoring system which aggregates performance data across all storage clusters 103A, 103B, 103C within a storage system.

In some examples, the controller node 204 may include a buffer table, which receives all commands (e.g., write commands 201) to interact with data blocks stored across the storage cluster 103A, 103B, 103C. For instance, the buffer table may be associated with a queue of commands received by the storage cluster 103A, 103B, 103C which require processing. In some examples, the controller node 204 may include a buffer table for respective storage nodes within the storage cluster 103A, 103B, 103B. For instance, respective storage nodes may include varying processing and storage capabilities. In some examples, storage nodes may be associated with one or more data tiers. By way of example, respective storage nodes may include faster or slower processors and computing resources to execute commands with varying latency. In some examples, the controller node 204 may orchestrate the allocation of commands within the buffer table to respective storage nodes 204 based on the processors or computing resources. An example of allocating commands based on storage nodes with varying computing resources (e.g., data tiers) is further described with reference to FIGS. 3-5.

In some examples, the controller node 204 may include a master buffer table for all storage nodes within the storage cluster 103A, 103B, 103C. For instance, a master buffer table may aggregate individual buffer tables for respective storage nodes across the storage cluster 103A, 103B, 103C. By way of example, the master buffer table may include data indicating processing capacity and resources of the respective storage nodes and the assigned queue of commands to be processed by respective storage nodes. In some examples, the controller node 204 may assign a command based on the computing resources of the storage nodes. In some examples, the controller node 204 may assign a command based on requirements for the data associated with the command. For instance, data associated with the command may include latency requirements that require the command to be processed instantly. In some examples, the controller node 204 may include the command in a master buffer table and assign the command to a storage node (e.g., data tier) which includes processing resources sufficient to process the command instantly. In some examples, the buffer table may be included within performance data transmitted to the storage monitoring system. An example of data tiers processing commands based on latency requirements if further described with reference to FIG. 3

Returning to FIG. 2, the controller node 204 may queue the command on the buffer table and authorize the processing of the command. For example, the controller node may identify the specific storage node (e.g., primary master node 205) within the storage cluster 103A, 103B, 103C which will execute the request. In some examples, the controller node 204 may identify a primary master storage node 205 and notify the request handler 202 of the specific primary master node 205 where the command may be executed. In some examples, the request handler 202 may receive the notification of the identity of the primary master storage node 205 and direct the write command 201 to the primary master node 205 to execute the command. In some examples, primary master node 205 may include processors and computing resources to perform the write command 201. For instance, the primary master node 205 may utilize the processors and resources to perform the write command by writing the data to a data block within a primary minion 206. The primary minion 206 may include storage and memory resources where data blocks may be stored. In some examples, the primary minion 206 may include HDD storage. In some examples, the primary minion 206 may include SDD storage. In other examples, the primary minion 206 may include both HDD and SDD storage.

In some examples, the primary minion 205 may be associated with the primary master storage node 205. For instance, the primary master storage node 205 may be authorized to perform actions on data blocks stored within the primary minion 206. In some examples, the relationship between the primary master storage node 205 and the primary minion 206 may be static. For instance, the write command 201 may be associated with data with a low latency requirement. In some examples, the a primary master storage node 205 which includes processors sufficient to satisfy the low latency requirements may be assigned to execute the command. For instance, the commands may need to be executed within a specified time (e.g., latency) to avoid performance issues with the microservices. In some examples, the primary master storage node 205 may be associated with a hot data tier. In some examples, the a primary minion associated with SDD storage to allow for faster interactions may be assigned as the primary minion 206. For instance, the faster processor of the primary master storage node 205 and the primary minion 206 including SDD storage may be associated with a hot data tier to instantly execute commands to satisfy latency requirements.

In some examples, the relationship between the primary master storage node 205 and the primary minion 206 may be dynamic. For instance, the write command 201 may not be associated with a latency requirement or a high latency requirement. In some examples, the primary master storage node 205 may be associated with a warm or cold data tier which includes slower processors to execute the commands. For instance, certain data may not cause latency or performance issues within a microservice and may allow for slower processing of commands. In some examples, the primary minion 206 which includes SDD storage that allows for faster interactions may be assigned the primary master storage node 205 associated with slower processors (e.g., warm tier, cold tier, etc.). For instance, requirements for interactions with data may change over time. For example, data may require low latency during increased usage time of a microservice and may be stored in SDD storage when written to a storage cluster 103A, 103B, 103C. In some examples, the same data may allow for higher latency during decreased usage of the microservice but may remain in SDD storage. In some examples, the primary master storage node 205 and primary minion 206 relationship may change as latency requirements for the data changes.

Returning to FIG. 2, the primary master storage node 205 may process the write command 201 and write the data to the primary minion 206. In some examples, the primary minion 206 may include a database table defined by a database schema. In some examples, the primary minion 206 may include a plurality of database tables defined by a plurality of database schemas. In some example, the primary minion 206 may include any computing system capable to storing any data. In some examples, the primary minion 206 may include a distributed data store. For instance, the primary minion 206 may include data stores associated with other data stores distributed across a plurality of storage nodes. In some examples, a storage cluster 103A, 103B, 103C may include a plurality of primary minions 206 to store data in a distributed manner. In some examples, the plurality of primary minions 206 may operate as a single distributed storage unit across a storage cluster 103A, 103B, 103C. In some examples, a storage system may include a plurality of storage clusters 103A, 103B, 103C and operate as a single distributed storage unit.

In some examples, the primary minion 206 may write the data to a data block and a background worker 203 may poll the primary minion 206 for a response. For instance, the worker nodes 102A, 102B, 102C may include a background worker 203. The background worker 203 may include software deployed to the worker nodes 102A, 102B, 102C. For instance, the background worker 203 may be software running on a server of the worker nodes 102A, 102B, 102C. In some examples, the background worker 203 may poll (e.g., wait for a state change) the primary minion 206 to determine when the write command 201 had been executed. By way of example, the background worker 203 may poll the primary minion 206 by checking every millisecond for a newly created cell within a storage block of the primary minion 206. In some examples, the background worker 203 may determine the primary master storage node 205 has executed the write command by identifying the newly created cell within the storage block of the primary minion 206.

In some examples, the background worker 203 may determine the write command 201 has been executed and return a response to the request handler 202. For instance, the response may indicate that the write command 201 has been executed and indicate the route (e.g., path to the newly created cell). In some examples, the background worker 203 may update the buffer table after determining the write command 201 has been executed. For instance, the background worker 203 may transmit a request to the controller node 204 to delete the write command 201 from the buffer table. In some examples, the controller node 204 may update the buffer table by deleting the write command 201 and proceed to distributing the remaining commands queued in the buffer table.

In some examples, the controller node 204 may include updates to the buffer table in the performance data. For instance, a storage monitoring system may aggregate performance statistics across the plurality of storage clusters 103A, 103B, 103C within a storage system. In some examples, the performance statistics may be used to optimize the performance of the storage clusters 103A, 103B, 103C within a storage system. An example of performance statistics being collected by a storage monitoring system is further described with reference to FIG. 3.

Figure 3:
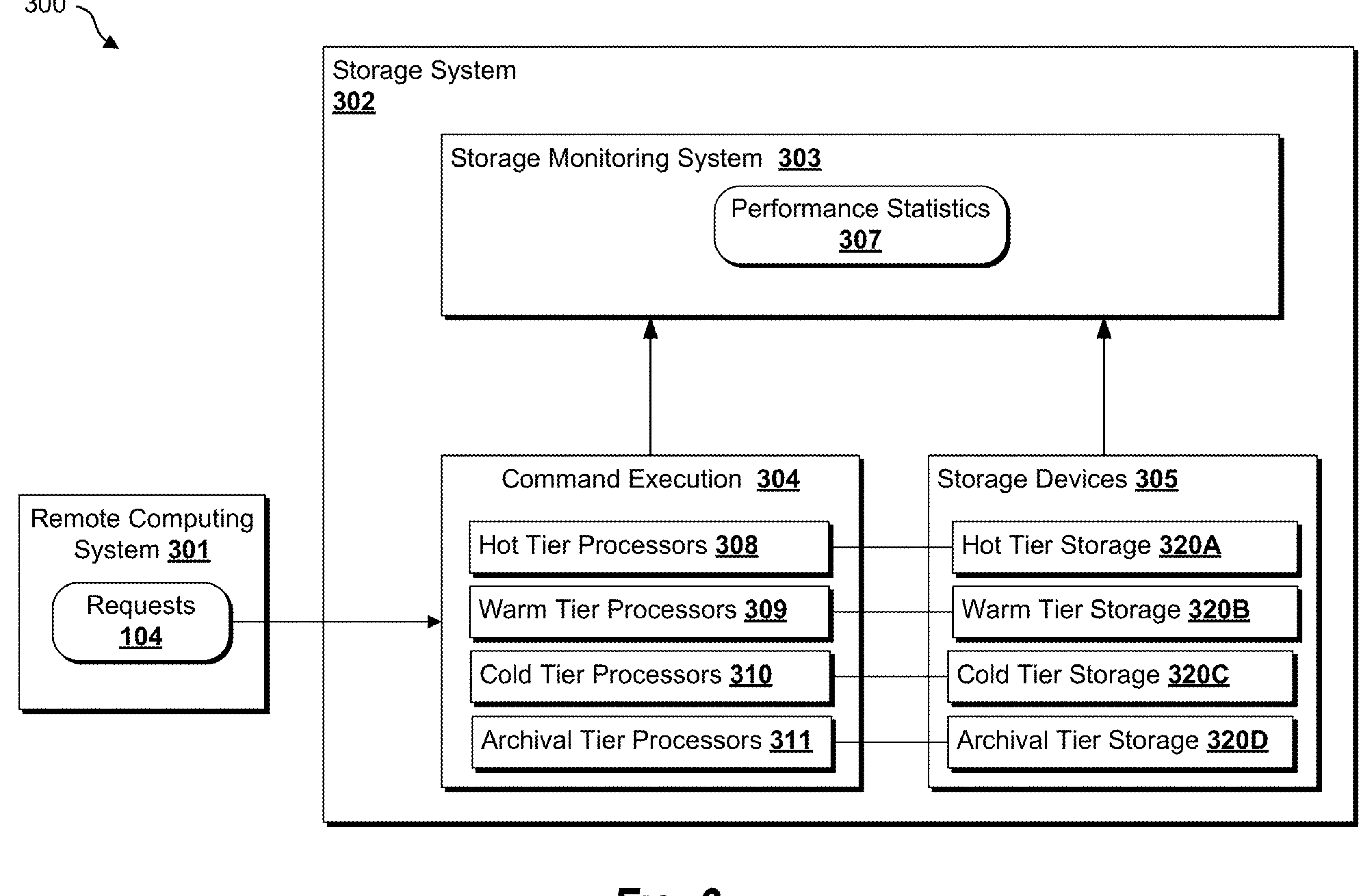
FIG. 3 depicts an example computing system according to example aspects of the present disclosure.

FIG. 3 depicts an example computing ecosystem system according to example aspects of the present disclosure. The example system 300 may include a one or more remote computing systems 301 and a storage system 302. In some examples, the remote computing systems 301 may transmit one or more requests 104 to the storage system 302. In some examples, the storage system 302 may receive and process the requests 104 using one or more subsystems. In some examples, the storage system 302 may prioritize the processing of the requests 104 using the one or more subsystems. For instance, the storage system 302 may include processors and storage devices which include varying processing and storage capabilities. In some examples, requests 104 which have been prioritized may be processed by processors which process request 104 more quickly than other processors.

With respect to examples as described herein, the system 300 may be implemented on a server, on a combination of servers, or on a distributed set of computing devices which communicate over a network such as the Internet. For example, the system 300 may be distributed using one or more physical servers, virtual private servers, containers, cloud computing, etc. In some examples, the system 300 may be implemented as a part of or in connection with the remote computing systems 301, where, for example, the remote computing systems 301 may include a computing device, such as a smartphone, tablet computer, laptop computer, VR or AR headset device, and the like. As such, the remote computing system 301 may include components such as a user interface, a satellite receiver, and a communication interface to communicate with external entities using any number of wired and wireless communication protocols. In some examples, the remote computing system 301 may store a designated service application client (e.g., clients 101A, 101B) in a local memory. In some examples, the memory may store additional applications executable by one or more processors of the remote computing device 301, enabling access and interaction with one or more host servers over one or more networks. In some examples, remote computing system 301 may communicate with the storage system 302 over one or more networks.

In some examples, the remote computing system 301 may transmit requests 104 to the storage system 302 to interact with data within the storage system 302. For instance, the requests 104 may be an API request to interact with data in the storage system 301. For example, the requests 104 may include a GET, POST, PUT, DELETE, or BATCH function. The GET, POST, PUT, DELETE, or BATCH function may perform operations on data stored within the storage system 302. By way of example, a GET request may retrieve data, a POST request may publish data, or a DELETE request may delete data within the storage system 302. In some examples, the request 104 may include a request to interact with data and a request for a response indicating that the request 104 was processed.

In some examples, the storage system 302 may include one or more subsystems that receive and process requests 104. For example, the storage system 302 may include a storage monitoring system 303, a command execution system 304 and storage devices 305 associated with the command execution system 304. In some examples, the storage system 302 may be implemented on a server, on a combination of servers, or on a distributed set of computing devices which communicate over a network such as the Internet. For example, the storage system 302 may be a distributed file system. A distributed file system may include a set of client and server services that allow servers to organize distributed file shares into a single distributed file system. In some examples, the storage system 302 may include a file system that enables clients (e.g., clients 101A, 101B) to access file storage from multiple hosts through a computer network. In some examples, the storage system 302 may include any type of file system where data may be stored. For instance, the storage system 302 may include various types of storage such as HDD storage or SDD storage. In some examples, the storage system 302 may manage various types of storage in a distributed manner.

In some examples, the storage system 302 may include a storage monitoring system 303. The storage monitoring system 303 may include software running on one or more servers within the storage system 302 which monitors the performance and utilization of the storage system 302. For instance, the storage monitoring system 303 may include software that provides storage administrators with detailed data associated with the individual storage devices (e.g., servers, nodes, clusters, etc.) within the storage system 303, traffic (e.g., inbound/outbound requests), or performance (e.g., latency). In some examples, the storage monitoring system 303 may include regularly monitoring availability, performance, exceptions, and configurations. For example, the storage monitoring system 303 may indicate when or if an issue needs to be resolved within the storage system 303.

By way of example, the storage monitoring system 303, may detect that a specific cluster (e.g., storage clusters 103A, 103B, 103C) within the storage system 302 has failed to execute the previous 4 queued commands by receiving performance statistics 307 from the command execution system 304 and the storage devices 305. The storage monitoring system 303 may alert a storage system administrator of the issue to address failures prior to reliant microservices or applications sustaining adverse effects. In some examples, the storage monitoring system 303 may collect performance statistics 307 from the command execution system 304 and the storage devices 305. For instance, the storage monitoring system 303 may identify an issue with processing commands and determine the issue is related to the storage devices 305 rather than the command execution system 304 based on receiving performance statistics 307 from both the command execution system 304 and the storage devices 305.

In some examples performance statistics 307 may include workload statistics. For instance, a workload may include a set of inbound/outbound (I/O) characteristics running through a group of virtual machines that interface with a network and storage infrastructure. By way of example, an application (e.g., clients 101A, 101) may interact with a web-server, one or more application servers (e.g., worker nodes 102A, 102B, 102C), and database servers (e.g., storage clusters 103A, 103B, 103C). In some examples, the combination of these respective servers may indicate the applications workload. In some examples, the performance statistics 307 may include statistics associated with an application's workload. In some examples, the performance statistics 307 may include statistics associated with the workload of the storage system 302. Example performance statistics 307 may include I/O mix (e.g., read or write heavy workloads, read or write balance workloads etc.), I/O type (e.g., does the workload read/write sequentially, randomly, prioritized, etc.), data block size (e.g., size of the data being read/written), etc. Performance statistics 307 may include any characteristics associated with the impacts of storage latency, IOPS, or throughput.

In some examples, the storage system 302 may include a command execution system 304. The command execution system 304 may include software running on one or more nodes (e.g., controller nodes 203) within the storage system 302 which controls the distribution and processing of commands across the storage system 302. In some examples, the command execution system 304 may include an orchestration service. For instance, the command execution system 304 may include the orchestration service which controls a plurality of storage clusters 103A, 103B, 103C across the storage system 302. For example, the command execution system 304 may be implemented using one or more containers (e.g., standalone software package for a software application) using a container service, or on VMs (virtual machines) within a shared network. In some examples, the command execution system 304 may include software installed across a plurality of storage clusters 103A, 103B, 103C within the storage system 302. For instance, the command execution system 304 may include the controller node 203 within each storage cluster 103A, 103B, 103C.

In some examples, the command execution system 304 may include a buffer table. For example, the command execution system 304 may orchestrate the allocation of requests 104 within the buffer table to respective processors associated with the command execution system 304 based on the capabilities of the processors. In some examples, the command execution system 304 may include a master buffer table for all processors across the storage system 302. In some examples, the master buffer table may include data indicating the processing capacity and resources of the respective processors and the assigned queue of requests 104 to be processed by respective processors. In some examples, the command execution system 304 may assign a request 104 based on the computing resources of the storage nodes.

In some examples, the command execution system 304 may include one or more storage nodes associated with data tiers. A data tier may control the servers or processors which process requests 104 to interact with data. In some examples, the data tier may be associated with servers or processers which execute requests 104 with varying degrees of latency or performance. For instance, a data tier may be associated with servers or processors which process requests 104 (e.g., I/O requests) instantly (e.g., within 50 milliseconds or less). In some examples, a data tier may be associated with servers or processors which process requests with high latency (e.g., 100 milliseconds or higher).

In some examples, the command execution system 304 may include hot tier processors 308. The hot tier processors 308 may be associated with a hot data tier. For instance, the hot tier processors 308 may be associated with servers, processors, or storage devices (e.g., storage devices 305) which produce the lowest latency (e.g., the fastest processors) within the storage system 302. For example, the hot tier processors 308 may produce a latency of 50 milliseconds or less. In some examples, the hot tier processors 308 may process requests 104 which require instant processing. For instance, the command execution system 304 may assign requests 104 which include latency requirements of 50 milliseconds or less to the hot tier processors 308.

By way of example, the remote computing system 301 may transmit requests 104 to interact with data stored within the storage system 302. In some examples, the requests 104 may be associated with data which is critical to the functioning of an application (e.g., client 101A, 101B) running on the remote computing system 301. In some examples, the storage system may receive the request 104 and the command execution system 304 may queue the request 104 on a buffer table. In some examples, the request 104 associated with critical data may be queued for processing by the hot tier processors 308 to be processed more quickly. In some examples, the remote computing system 301 may provide data indicating which requests 104 may be processed by the hot tier processors 308. An example of the remote computing system 301 providing data indicating a priority of requests 104 is further described with reference to FIG. 4.

In some examples, the command execution system 304 may include warm tier processors 309. The warm tier processors 309 may be associated with a warm data tier. For instance, the warm tier processors 309 may be associated with processors which produce latency higher than the hot tier processors 309. For example, the warm tier processors 309 may produce a latency of 60-80 milliseconds. In some examples, the command execution system 304 may determine that requests 104 are associated with data which is less critical and may queue the request 104 to be processed by the warm tier processors 309.

By way of example, the warm tier processors 309 may process requests associated with older data. For instance, the remote computing system 301 may write data to the storage system 302 associated with a service request for a user. In some examples, the data associated with the service request may be processed by the hot tier processors 308 due to the newly generated request. For instance, the remote computing system 301 may need to interact with the data associated with the service request while the request is in progress. In some examples, the data associated with the service request may be processed by the warm tiers several weeks later. For instance, the remote computing system 301 may transmit a request 104 to interact with the data associated with the service request from several weeks prior to provide historic or summary information on previous service request. In some examples, the less frequent demand for the data may indicate that the data may tolerate a higher latency and be processed by the warm tier processors.

In some examples, the command execution system 304 may determine the request 104 is associated with data which has not be accessed in a threshold period of time and queue the request 104 to be processed by the warm tier processors 309. In some examples, the remote computing system 301 may provide data indicating the request 104 may be processed by the warm tier processors 309. In some examples, the command execution system 304 may move data across the hot tier processors (e.g., hot data tier) to the warm tier processors (e.g., warm data tier) based on data provided by the remote computing system 301. An example of data moving across data tiers is further described with reference to FIG. 4.

In some examples, the command execution system 304 may include cold tier processors 310. The cold tier processors 310 may be associated with a cold data tier. For instance, the cold tier processors 310 may be associated with processors which produce latency higher than the hot tier processors 308 and the warm tier processors 309. For example, the cold tier processors 310 may produce a latency of 80-100 milliseconds. In some examples, the command execution system 304 may determine that requests 104 are associated with data which is not critical and may queue the request 104 to be processed by the cold tier processors 310.

By way of example, the remote computing system 301 may transmit a request 104 associated with data which is rarely accessed by the remote computing system 301. For instance, the request 104 may be associated with a user's address, payment information, or user profile information which may change on infrequent occasions. In some examples, the command execution system 304 may determine the request 104 associated with data which is rarely access may be queued for processing by the cold tier processors 310 due to the rare interactions with the data. In some examples, the remote computing system 301 may provide data indicating the data should be processed by the cold tier processors 310. An example of the remote computing system 301 providing data indicating a priority of requests 104 is further described with reference to FIG. 4.

In some examples, the command execution system 304 may move data across the hot tier processors 308 (e.g., hot data tier) to the cold tier processors 310 (e.g., cold data tier) based on data provided by the remote computing system 301. In some examples, the command execution system 304 may move data across the warm tier processors 309 (e.g., warm data tier) to the cold tier processors 310 (e.g., cold data tier) based on data provided by the remote computing system 301. An example of data moving across data tiers is further described with reference to FIG. 4.

In some examples, the command execution system 304 may include archival tier processors 311. The archival tier processors 311 may be associated with an archival data tier. For instance, the archival tier processors 311 may be associated with processors which produce latency higher than the hot tier processors 309, warm tier processors 310, and the cold tier processors 311. For example, the archival tier processors 311 may produce a latency of 100 milliseconds or greater. In some examples, the command execution system 304 may determine that requests 104 are associated with data which should be archived and may queue the request 104 to be processed by the archival tier processors 311.

By way of example, the remote computing system 301 may transmit a request 104 associated with data which should be archived. For instance, the request 104 may include one or more functions which indicate data should be archived or archived data should be retrieved. For example, a user may update a personal preference associated with a service request and the remote computing system 301 may transmit a request 104 to archive the previous personal preference. In some examples, the command execution system 304 may determine the request 104 is associated with data which should be archived and queue the request 104 to be processed by the archival tier processors. In some examples, the remote computing system 301 may provide data indicating the requests 104 which should be processed by the archival tier processors.

In some examples, the command execution system 304 may move data across the plurality of data tiers, (e.g., hot tier processors 308, warm tier processors 309, cold tier processors 310) to the archival data tier (e.g., archival tier processors 311). In some examples, the command execution system 304 may move data based on a threshold time of interactions with the data. In some examples, the command execution system 304 may move data based on the performance of the storage system. In some examples, the command execution system 304 may move data across data tiers based on data provided by the remote computing system 301. An example of data moving across data tiers based on data provided by the remote computing system 301 is further described with reference to FIG. 5.

In some examples, the storage system 302 may include storage devices 305. In some examples, the storage devices 305 may include a hot tier storage 320A, warm tier storage 320B, cold tier storage 320C, and archival tier storage 320D. In some examples, the hot tier storage 320A, warm tier storage 320B, cold tier storage 320C, and archival tier storage 320D may be associated with a distributed file system. For instance, the hot tier storage 320A, warm tier storage 320B, cold tier storage 320C, and archival tier storage 320D may include various types of storage devices distributed across a plurality of storage clusters.

For example, the hot tier storage 320A and warm tier storage 320B may be associated with SDD storage to allow for faster processing of critical read/write commands within requests 104. In some examples, the cold tier storage 320C and archival tier storage 320D may be associated with HDD storage to allow for more stable storage of data which is less critical. In some examples, hot tier storage 320A, warm tier storage 320B, cold tier storage 320C, and archival tier storage 320D may all be associated with SDD storage or HDD storage.

In some examples, the hot tier storage 320A, warm tier storage 320B, cold tier storage 320C, and archival tier storage 320D may be associated with respective storage clusters (e.g., storage clusters 103A, 103B, 103C). By way of example a storage cluster (e.g., storage cluster 103A, 103B, 103C) may include only hot tier storage 320A devices. In some examples, the hot tier storage 320A, warm tier storage 320B, cold tier storage 320C, and archival tier storage 320D may be associated with individual storage nodes in a storage cluster (e.g., storage cluster 103A, 103B, 103C). For instance, the hot tier storage 320A, warm tier storage 320B, cold tier storage 320C, and archival tier storage 320D may be associated with one or more storage nodes within a single storage cluster (e.g., storage cluster 103A, 103B, 103C).

In some examples, the hot tier storage 320A, warm tier storage 320B, cold tier storage 320C, and archival tier storage 320D may be associated with the processors of the command execution system 304. For instance, the hot tier storage 320A, warm tier storage 320B, cold tier storage 320C, and archival tier storage 320D may store or retrieve the data processed by the hot tier processors 308, warm tier processors 309, cold tier processors 310, and archival tier processors 311 respectively. In some examples, the hot tier storage 320A, warm tier storage 320B, cold tier storage 320C, and archival tier storage 320D may be associated with a data tier. For instance, the hot tier storage 320A, warm tier storage 320B, cold tier storage 320C, and archival tier storage 320D and hot tier processors 308, warm tier processors 309, cold tier processors 310, and archival tier processors 311 may be coupled as a data tier.

By way of examples, the remote computing system 301 may transmit a request 104 to interact with critical data. The command execution system 104 may determine the request 104 is associated with critical data and requires a response with low latency and queue the request 104 to be processed by the hot tier processors 308. In some examples, the hot tier processors 308 may be associated with hot tier storage 320A. For instance, the hot tier storage 320A may be associated with one or more storage devices which allow for instant retrieval of data. In some examples, the hot tier processors 302 may process the request 104 associated with critical data and write or read data from the hot tier storage 320A.

In some examples, the storage devices 305 may be dynamically associated with the processors of the command execution system 304. For instance, the storage devices 305 may include a plurality of storage devices which store data block. In some examples, data written to a data block stored on a storage device (e.g., hot tier storage 320A, warm tier storage 302B, cold tier storage 320C, archival tier storage 320D) may move (e.g., reassigned) and become associated with a different processor of the command execution system 304.

By way of example, requests 104 received by the command execution system 304 to write data may be processed by the warm tier processors 309. In some examples, the warm tier processors 309 may execute the requests 104 and write data to a data block included in storage devices associated with the warm tier storage 320B. In some examples, the requests 104 to interact with the data block included in the storage devices associated with the warm storage tier 320B may increase beyond a threshold in which the warm tier processors 309 may not satisfy latency requirements associated with the requests 104. In some examples, the command execution system 304 may begin queuing requests 104 to interact with the data to be processed by the hot tier processors 308. In some examples, the storage devices which include the storage blocks of storing the data may be moved (e.g., reassigned) to the hot tier storage 320A to allow the hot tier processors 308 which satisfy the latency requirements to process the requests 104. In some examples, the individual storage devices associated with the hot tier storage 302A, warm tier storage 320B, cold tier storage 320C, and archival tier storage 320D may move (e.g., reassigned) to another data tier which aligns with the processors computing resources.

In some examples, storage devices 305 may perform as a single storage system. For example, the plurality of processors of the command execution system 304 may interact with the plurality of storage devices 305 respectively. For instance, the hot tier storage 320A, warm tier storage 320B, cold tier storage 320C, and archival tier storage 320D may all include SDD storage which allow for instant retrieval. For example, the hot tier processors 308 may process requests 104 across the hot tier storage 320A, warm tier storage 320B, cold tier storage 320C, and archival tier storage 320D due to the similar storage capabilities. In some examples, the remote computing system 301 may provide data indicating the type of storage device 305 (e.g., hot tier storage 320A, warm tier storage 320B, cold tier storage 320C, archival tier storage 320D) which should be associated with the request 104. For instance, the data provided by the remote computing system 301 may indicate an associated data tier. An example of the remote computing device 301 providing data indicating a data tier is further described with reference to FIG. 4

Figure 4:
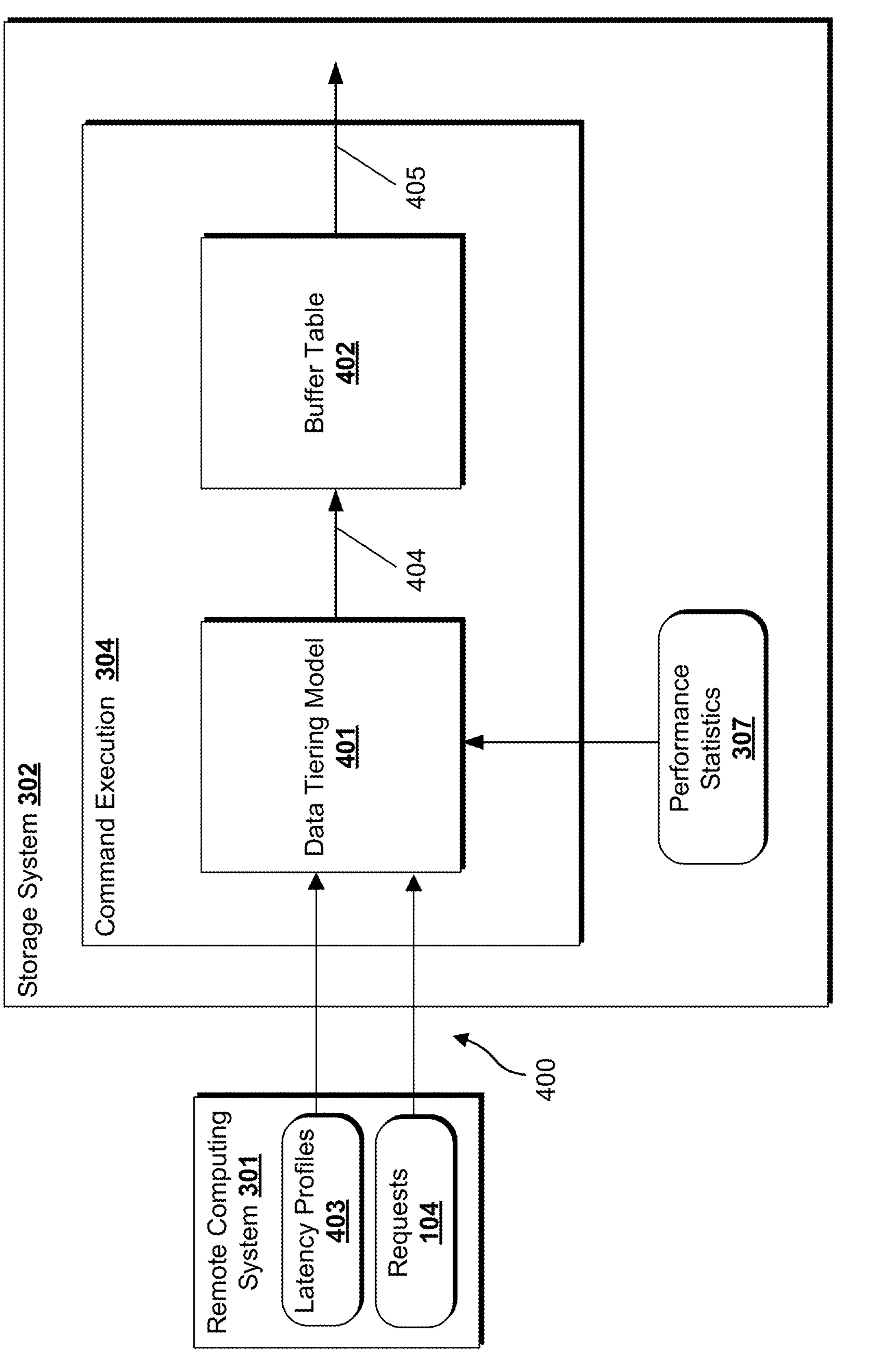
FIG. 4 depicts an example data pipeline according to example aspects of the present disclosure.

FIG. 4 depicts an example data pipeline according to example aspects of the present disclosure. The following description of data flow pipeline 400 is described with an example implementation in which a data tiering model 401 receives a plurality of latency profiles 403 and requests 104 from one or more remote computing systems 301. In some examples, the data tiering model 401 may receive performance statistics 307, and the data tiering model 401 may generate output 404 indicative of one or more updated parameters that adjusts a percentage of data being classified in a first data tier to being reclassified in a second data tier. For example, the performance statistics 307 may indicate that one or more profiles of the latency profiles 307 will not be satisfied based on the current classification. In some examples, the output 404 may be received by a buffer table 402 and the buffer table 402 may apply the output 404 to reflect the percentage of data being reclassified in the second data tier. In some examples, the buffer table 402 may output 405 data indicating the percentage of data being reclassified and one or more processors associated with a plurality of data tiers may process the requests 104 based on the adjusted percentage of data. Additionally, or alternatively, one or more portions of the dataflow pipeline 400 may be implemented across the storage devices 305.

The remote computing system 301 may transmit latency profiles 403 to the data tiering model 401. Latency profiles 403 may include data indicating a plurality of latency requirements for data associated with an application or one or more microservices. For instance, latency profiles 403 may be defined by an application owner or custodian of a microservice. In some examples, latency profiles 403 may include a configuration file which defines requirements for specific types of data associated with the application or microservice. In some examples, the configuration file may specify latency thresholds or requirements which must be satisfied to prevent performance issues within the application or microservice. In some examples, latency profiles 403 may be provided to the command execution system 304 during initial deployment or implementation of the application or microservice. For instance, providing the latency profiles 403 during initial deployment may prevent any performance or latency related issues when the application or microservice moves into production.

In some examples, the command execution system 304 may set default parameters for movement of data to satisfy the plurality of latency profiles 403. For example, the default parameters may be associated with the movement of data defined by the plurality of latency profiles 403. By way of example, the plurality of latency profiles 403 may indicate a movement of data across the plurality of data tiers based on a threshold time where the data has not been accessed. For instance, data which has not been accessed (e.g., no associated requests 104) in the last 30 seconds may tolerate a higher latency than data which is being accessed (e.g., associated with a request 104) every 5 seconds. In some examples, the latency profiles 403 indicating the threshold time of interactions may be applied as default parameters for classifying data associated with requests 104 in a respective data tier.

In some examples, default parameters may include one or more rules for assigning (e.g., queuing) a request 104 to a respective processor (e.g., hot tier processors 308, warm tier processors 309, cold tier processors 310, archival tier processors 311) to be executed. For instance, default parameters may include rules for queueing a command in a buffer table that assign the command to a storage node (e.g., data tier) which includes processing resources sufficient to process the command. In some examples, default parameters may include processing resources. For instance, default parameters may include assigning sufficient queue depths. Queue depths may indicate the number of requests 104 (e.g., commands) which may be executed in parallel by the processors. In some examples, the queue depths may vary based on the processors (e.g., data tier). For instance, hot tier processors 308 may be associated with a hot data tier and include queue depths that may only process 32 commands per queue. For instance, in order to maintain a low latency, the number of commands per queue may be reduced.

In some examples, the default parameters may satisfy the plurality of latency profiles 403. For instance, the default parameters may define the rules for assigning requests 104 to data tiers and include sufficient resources to maintain the integrity of the latency profiles in a stable environment. In some examples, the storage system 302 may not maintain a stable environment. For instance, the storage system 302 may experience a data outage in the primary region where the storage system 302 is located. In some examples, the storage system 302 may experience failover and need to sever requests from a second data center which has replicated the storage system 302. In some examples, the routing of requests to the second data center may introduce an unstable environment. In some examples, the default parameters may need to be updated to maintain the plurality of latency profiles 403.

For example, the latency profiles 403 may define the types of data and data requests handled by the microservice or application. For instance, a microservice may include a plurality of API endpoints which facilitate requests from clients (e.g., clients 101A, 101B). In some examples, the plurality of API endpoints is finite and the types of data and types of requests 104 for data may be known. In some examples, the latency profiles 403 may include the respective types of data and types of requests 104 for data that may be stored and transmitted to the storage system 302. In some examples, the latency profiles 403 may define (e.g., profile) the types of data which are critical for the execution and performance of the application. In some examples latency profiles 403 may profile data which may periodically become critical for execution and performance of the application. In other examples, the latency profiles 403 may profile data which may be low priority data and may not be critical for execution and performance of the application.

In some examples, the latency profiles 403 may profile data to prioritize request 104 associated with the data. For instance, the latency profiles 403 may include a plurality of profiles that profile data based on a latency tolerance level. In some examples, the plurality of latency profiles 403 that profile data based on a latency tolerance level may be dynamic. For instance, data may be profiled based on how frequently the microservice interacts with the data. In some examples, the frequency of interactions may indicate the respective profile of the plurality of latency profiles 403 associated with the data. As the frequency of interactions changes, the respective profiles may also change. In some examples, the change in profiles may be indicative of the default parameters for data movement.

By way of example, the latency profiles 403 may profile data associated with the application or microservice based on expected latency. For instance, the latency profiles 403 may profile data which has been included in a request 104 at least 100 times per minute as critical for execution and performance. For instance, data which includes network configuration files that allow the microservice or application to access the network may be included in a request 104 each time a user interacts with the application and will always exceed the threshold of 100 requests per minute. In some examples, the latency profiles 403 may include a first profile that indicates requests 104 which meet this threshold require a latency of 20 milliseconds or less to ensure that the application may always access the network. In some examples, the command execution system 304 may classify data associated with the first profile which includes a latency requirement of 20 milliseconds in a data tier which includes one or more processors which may satisfy the latency requirement of 20 milliseconds or less.

In some examples, latency requirements (e.g., latency profiles 403) associated with data may change. In some examples, latency requirement changes may be based on the frequency of interactions with the data. For example, data which was previously not considered critical and associated with a non-critical latency may become critical and the data may need to be associated with a critical latency profile to update the latency requirements. By way of example, data associated with the geographical location of the remote computing system 301 relative to a destination location indicated in a service request may become critical as the service request is in progress. For example, a user may submit a service request for transportation services and a request 104 to write data indicating the current location of the remote computing system 301 and the destination location may be transmitted to the storage system 302. In some examples, the request 104 to write data may tolerate a latency of 60-80 milliseconds due to the initial infrequency of requests 104 associated with the data. For instance, the data may be profiled as a second profile of the plurality of latency profiles. A second profile may be associated with data which has been accessed at least 50 times per minute.

In some examples, the data indicating the current location of the remote computing system 301 and the destination location may be classified in a warm data tier. For instance, the warm data tier may be associated with the warm tier processors 310 which produce a latency of 60-80 milliseconds. In some examples, the frequency of requests 104 to interact with the data indicating the current location of the remote computing system 301 and the destination location may increase. For instance, providing turn by turn updates or ETA information may be required. In some examples, the increase in requests 104 to read data to facilitate updates or ETA may increase to 100 requests per minute and the data may need to be associated with a first profile instead of the second profile. In some examples, the increased frequency of interactions may indicate the data should be associated with the first profile. For instance, turn by turn directions and an ETA measurement may require a lower latency such as 50 milliseconds or less to prevent performance issues. In some examples, the change from the second profile to the first profile may indicate the data should be reclassified in a hot data tier which includes hot tier processors 308 to satisfy the latency requirement of the first profile.

In some examples, the latency profiles 403 may include a plurality of profiles. For instance, the latency profiles 403 may include 7 profiles for data. In some examples, the latency profiles 403 may include more than 7 profiles. In other examples, the latency profiles may include less than 7 profiles. In some examples, the number of profiles defined by the latency profiles 403 may vary based on the needs of the application or microservice. For instance, more complex applications which include an increased number of API endpoints or types of data may include more profiles. In some examples, the latency profile 403 may be evenly associated with data tiers. For example, the latency profiles 403 may include 4 profiles associated with a hot data tier, warm data tier, cold data tier, and archival data tier respectively. In some examples, the latency profiles 403 may be unevenly associated with data tiers. For example, the latency profiles may include 7 profiles where 2 profiles are associated with the hot data tier, 3 profiles are associated with the warm data tier and 1 profile is associated with the cold and archival data tier respectively. In some examples, there may be any number of latency profiles 403 associated with any number of data tiers.

In some examples, the latency profiles 403 may profile data based on any latency threshold or frequency of interactions. For instance, a profile associated with a hot data tier may include a latency requirement of 100 milliseconds and require a frequency of interactions of 400 requests per minute. In some examples, the latency profiles 403 may profile data based on any measurable metric which allows the command execution system 304 to consistently associate data with a respective data tier. In some examples, the plurality of latency profiles 403 may be indicative of default parameters for moving (e.g., classifying) data across the plurality of data tiers.

Returning to FIG. 4, the data tiering model 401 may receive a plurality of requests 104 to interact with data within the storage system 302 from the remote computing system 301. For instance, the requests 104 may be transmitted via an API. In some examples, the requests 104 may be associated with data which has been profiled by the latency profiles 403. For instance, requests 104 may include a request to interact with critical data, periodically critical data, non-critical data, etc. In some examples, the latency profiles 403 may indicate a latency requirement for the data associated with the request 104. In some examples, the latency requirements defined by the latency profiles 403 may indicate a respective data tier.

By way of example, the latency profiles 403 may include a first latency profile which indicates data associated with a user request API endpoint. In some examples, the first latency profile within the latency profiles 403 may indicate that data associated with the first latency profile may tolerate a latency of 60-80 milliseconds. For instance, the user request API endpoint may expect a response to requests 104 made within 60-80 milliseconds to avoid performance issues. In some examples, the command execution system 304 may determine, based on the latency profiles, 403 that requests 104 associated with the user request API endpoint should be classified in a warm data tier due to warm tier processors 309 which produce a latency of 60-80 milliseconds. For instance, user request data may be stored in a warm storage tier 320A associated with the warm tier processors 310 to allow for responses within 60-80 milliseconds.

In some examples, the data tiering model 401 may receive performance statistics 307. For instance, the storage monitoring system 303 may collect performance statistics 307 indicating workload statistics for the storage system 302. For instance, a workload may include a set of inbound/outbound (I/O) characteristics running through a group of virtual machines that interface with a network and storage infrastructure. In some examples, the performance statistics 307 may indicate that data associated with a first latency profile should be associated with a second latency profile. For instance, the performance statistics 307 may indicate that data associated with a first latency profile has exceeded an interactions threshold for the first profile and should be associated with a second latency profile.

By way of example, the performance statistics 307 may include data indicating the measure of latency for I/O processing for requests 104 for user data. In some examples, the performance statistics 307 may include data indicating the total number of read/write commands executed against the user data in the last minute. In some examples, data stored in a warm data tier (e.g., warm tier storage 320A) may be associated with a latency profile 403 which may tolerate a latency of 60-80 milliseconds for data which is accessed 50 times per minute. In some examples, the performance statistics 307 may indicate that the user data is being accessed 100 times per minute and experiencing latency of 100 milliseconds. In some examples, the performance statistics 307 may indicate that the user data should be associated with the hot data tier which produces a latency of 50 milliseconds for data which is accessed 50 times per minute. For instance, the hot data tier (e.g., hot tier processors) may produce a latency which satisfies the associated latency profile 403.

Returning to FIG. 4, the data tiering model 401 may receive the latency profiles 403, requests 104, and performance statistics 307 to generate output 404 data indicative one or more updated parameters that adjusts a percentage of data being classified in a data tier. The data tiering model 401 may be or may otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

The data tiering model 401 may be trained through the use of one or more model trainers and training data. The model trainers may be trained using one or more training or learning algorithms. One example training technique is backwards propagation of errors. In some examples, simulations may be implemented for obtaining the training data or for implementing the model trainer(s) for training or testing the model(s). In some examples, the model trainer(s) may perform supervised training techniques using training latency profile, training requests, or training performance statistics. As further described herein, the training data may include test latency profiles, simulated requests, and simulated performance statistics. For instance, the training data may include simulated training data (e.g., training data obtained from simulated scenarios, inputs, configurations, test storage environments, etc.).

Additionally, or alternatively, the model trainer(s) may perform unsupervised training techniques using production training data. By way of example, the model trainer(s) may train one or more components of a machine-learned model to perform data signal processing through unsupervised training techniques using an objective function (e.g., costs, rewards, heuristics, constraints, etc.). In some implementations, the model trainer(s) may perform a number of generalization techniques to improve the generalization capability of the model(s) being trained. Generalization techniques include weight decays, dropouts, or other techniques.

In some examples, the data tiering model 401 may process the plurality of latency profiles 403, requests 104, and performance statistics 307 and detect one or more conditions that fail to satisfy at least one latency profile 403. For example, the data tiering model 401 may determine that one or more default parameters require adjustments based on the latency requirements defined by the plurality of latency profiles 403, the data associated with the requests 104, and the performance statistics 307.

By way of example, the performance statistics 307 may indicate that one or more default parameters classify 15% of requests 104 associated user data in a hot data tier due to 15% of user data typically experiencing 100 requests per minute and 25% of requests 104 associated with user data in a warm data tier due to 25% of user data typically experiencing 50 requests per minute. In some examples, the plurality of latency profiles 403 may indicate that data which is requested at least 100 times per minute requires a latency associated with a hot data tier and data which is requested at least 50 times per minute may tolerate a latency associated with a warm data tier.

In some examples, the data tiering model 401 may determine, based on the performance statistics 307, that 45% of user data is now experiencing 100 requests per minute and 10% of user data is now experiencing 50 requests per minute. In some examples, the data tiering model 401 may determine that default parameters which classify 15% of requests 104 associated with user data in a hot data tier and 25% in a warm data tier will not satisfy the plurality of latency profiles 403. For instance, 10% of user data assigned to the warm tier which is requested 100 times per minute may not experience a latency (e.g., 50 milliseconds or less) associated with a hot data tier despite experiencing 100 requests per minute. In some examples, the data tiering model 401 may determine that one or more default parameters may be adjusted to satisfy the plurality of latency profiles 403.

For instance, the data tiering model 401 may receive performance statistics that indicate that one or more default parameters classify 30% of merchant data in a hot data tier and 10% of merchant data in a warm data tier. In some examples, the data tiering model 401 may receive requests 104 that indicate a decrease in requests 104 associated with merchant data. For instance, the performance statistics 307 may indicate that only 10% of merchant data is experiencing 100 requests per minute and 30% of merchant data is experiencing 50 requests per minute. In some examples, the data tiering model 401 may adjust one or more parameters which reduce the percentage of merchant data classified in a hot data tier to 10% and increase the percentage of merchant data classified in a warm data tier to 30%. In some examples, the adjustment to decrease the percentage of merchant data classified in the hot data tier may allow a greater percentage of user data to be classified in the hot data tier. For instance, the data tiering model 401 may adjust one or more parameters to increase the percentage of user data classified in the hot data tier from 15% to 45% and decrease the percentage of user data classified in the warm data tier from 25% to 10%. In some examples, changes in percentage of data classified in the respective data tier may satisfy the plurality of latency profiles 403 for user data and merchant data.

In some examples, the performance statistics 307 may indicate that a plurality of requests 104 classified in a data tier will not satisfy the plurality of latency profiles 403 based in computing resources associated with the data tier. For instance, one or more default parameters may set a respective data tier (e.g., processors) to scale from 1 queue depth to 3 queue depths. In some examples, the volume of requests 104 received by the data tiering model 401 may indicate that the respective data tier may not satisfy the latency requirements for the data tier by scaling to 3 queue depths. In some examples, the data tiering model 401 may determine that the count of queue depths may need to be adjusted to accommodate the increase in requests 104 to satisfy the plurality of latency profiles 403.

By way of example, the default parameters for the cold data tier may include a default queue depth of 1 that may scale to a queue depth of 2. For example, the cold data tier may be associated with a latency profile 403 that profiles data which is rarely accessed and may tolerate a latency of 200 milliseconds. In some examples, the data tiering model 401 may receive an increase in requests 104 to write data associated with the latency profile that includes data rarely accessed. For instance, the requests 104 may include data associated with a one-time promotional code that a user may use when requesting services through the microservice or application. In some examples, the one-time promotional code may be included in a request 104 and associated with a latency profile 304 for data which is rarely accessed. In some examples, the latency profile 304 may be associated with a cold data tier. In some examples, the data tiering model 401 may receive an increase in the number of requests 104 to store the one time promotional code and determine based on the performance statistics 307 that 2 queue depths will not be sufficient to produce a latency of 200 milliseconds. In some examples, the data tiering model 401 may adjust the queue depth of the cold data tier to scale to 4 queue depths to process more requests 104 in parallel to satisfy the latency profile 403.

In some examples, the data tiering model 401 may determine one or more parameters indicative of a percentage of data movement across the plurality of data tiers which satisfies the plurality of latency profiles 403. For example, the data tiering model 401 may receive a plurality of requests 104 and the plurality of latency profiles 403 to determine an associated latency profile 403 for the data associated with the respective requests 104.

By way of example, the data tiering model 401 may determine that 10 percent of the requests 104 are associated with a latency profile 403 which requires a latency of 50 milliseconds or less based on the requests 104 including 100 requests per minute to interact with the data and a latency profile 403 which indicates data that is associated with at least 100 requests per minute require a latency of 50 milliseconds or less. In some examples, the data tiering model may analyze the performance statistics 307 to determine a data tier which may satisfy the latency requirements defined by the latency profiles 403. For instance, the data tiering model 401 may determine that a hot data tier (e.g., hot tier processors 308, hot tier storage 320A) is the appropriate classification to classify the data associated with the requests 104. In some examples, the performance statistics 307 may indicate that the hot data tier will be unable to satisfy the latency requirements defined by the latency profiles 403 due to an increased number of requests 104 which have been queued to be processed by the hot data tier. In some examples, the data tiering model 401 may determine that data which is queued to be processed by the hot data tier may be processed by a warm data tier while satisfying the plurality of latency profiles 403.

For instance, the data tiering model 401, may determine that 15% of the requests 104 which were previously classified in a hot data tier have experienced a decrease in the number of requests per minute. In some examples, the decrease in number of requests 104 may indicate that the data previously associated with a latency profile 403 that required classification in a hot data tier may be reclassified in a warm data tier. For instance, the latency profile 403 may indicate that data which is requested 50 times per minute may tolerate a latency of 60-80 milliseconds. In some examples, the data tiering model 401 may update one or more parameters of the command execution system 304 to reclassify 15% of data to the warm data tier and 10% of data to the hot data tier to satisfy the plurality of latency profiles.

In some examples, the one or more parameters may include one or more parameters of the processors (e.g., hot tier processors 308, warm tier processors 309, cold tier processors 310, archival tier processors 311) or parameters of the storage devices 305 (e.g., hot tier storage 320A, warm tier storage 320B, cold tier storage 320C, archival tier storage 320C). For example, the processors may include a plurality of queue depths. In some examples, queue depths may indicate the number of commands (e.g., requests 104) which may be executed by the processors of the respective data tier concurrently. In some examples, the number of commands per queue may vary across the plurality of data tiers. For instance, the processors 308 across the plurality of data tiers may be scaled to meet the demand of requests 104 and may be balanced across the command execution system 304.

Returning to FIG. 4, the data tiering model 401 may adjust one or more parameters and output 404 data indicative of the updated parameters. In some examples, the buffer table 403 may receive the output 404 and apply the updated parameter. For example, the buffer table 402 may receive all commands (e.g., write commands 201) to interact with data blocks stored across the storage system 302. For instance, the buffer table 402 may be associated with a queue of commands (e.g., requests) received by the storage 302 which require processing. In some examples, the buffer table 402 may include one or more controller nodes 204 for distributing the commands to the primary master nodes 205 for execution. In some examples, the buffer table 402 may indicate the processing resources of the respective primary master nodes 205. In some examples, the controller nodes may allocate additional resources to the primary master nodes 205 and balance the computing resources across the storage cluster 103A, 103B, 103C.

In some examples, the buffer table 402 may apply the output 404 and update the buffer table 402 to reflect the updated parameters. In some examples, applying the updated parameters may reclassify requests 104 which have not yet been processed. For instance, a first data tier may include a queue of 400 commands to execute and the buffer table 402 may apply the output 404 to reclassify 100 of the commands to a second data tier to execute. In some examples, applying the output 404 may include applying the updated parameters to future requests 104. For instance, commands which have already been classified may be processed, and the percentage of data indicated by the updated parameters may be applied to requests that are subsequently received.

In some examples, the buffer table may apply the output 404 and update the association of storage devices and processors. For instance, the updated parameters may indicate that data which is stored in archival tier storage 320D may need to be accessed more frequently and should be associated with cold tier processors 310. For instance, a onetime promotional code which is archived and stored in archival tier storage 320D may be reused for a current promotion. In some examples, the one or more storage devices within the archival tier storage 320D may be associated with the cold tier processors 310 to allow for interactions that satisfy the latency profile 403 associated with the cold data tier. In other examples, data may be replicated from storage tier storage to cold tier storage to allow for easier interactions with the data.

In some examples, the buffer table may output 405 the updated parameters to the plurality of processors and storage devices. For example, the updated queue of commands may be processed by the hot tier processors 308, warm tier processors 309, cold tier processors 310, and archival tier processors 311. In some examples, the output 405 may reflect the adjusted percentage of data classified in the respective data tiers. In some examples, the output 405 may reclassify the storage devices 305 to reflect the adjusted percentage of data classified in the respective data tiers.

In some examples, the data tiering model 401 may determine one or more patterns of adjusting the one or more parameters. For example, the data tiering model 401 may adjust one or more parameters to adjust a percentage of data being classified in a first data tier to being reclassified in a second data tier for a temporary period of time and readjust the one or more parameters back to the default parameters. In some examples, the data tiering model 401 may adjust the one or more parameters and determine the default parameters will no longer satisfy the plurality of latency profiles 403 and maintain the adjusted parameters. In other examples, the data tiering model 401 may determine one or more data movement policies that reflect the dynamic and statics patterns of adjusting the one or more parameters and apply the data movement policies to the data tiers to automatically adjust the one or more parameters given one or more conditions. An example of generating data movement policies is further described with reference to FIG. 5.

By way of example, the data tiering model 401 may adjust one or more parameters to reclassify user data in a hot data tier during the hours of 6 PM to 8 PM. For instance, users may be more active with the application or microservice during these hours and an increase in requests 104 to interact with user data may result in the data tiering model 401 adjusting one or more parameters to satisfy the plurality of latency profiles 403 during this time. In some examples, the data tiering model 401 may adjust one or more parameters to reclassify user data in a warm tier outside of these hours due to a decrease in active users. In some examples, the performance statistics 307 may indicate one or more patterns of adjusting parameters and determine a data movement policy which autonomically applies the adjustment of the one or more parameters. An example of the data tiering model 401 generating data movement policies based on performance statistics 307 is further described with reference to FIG. 5

Figure 5:
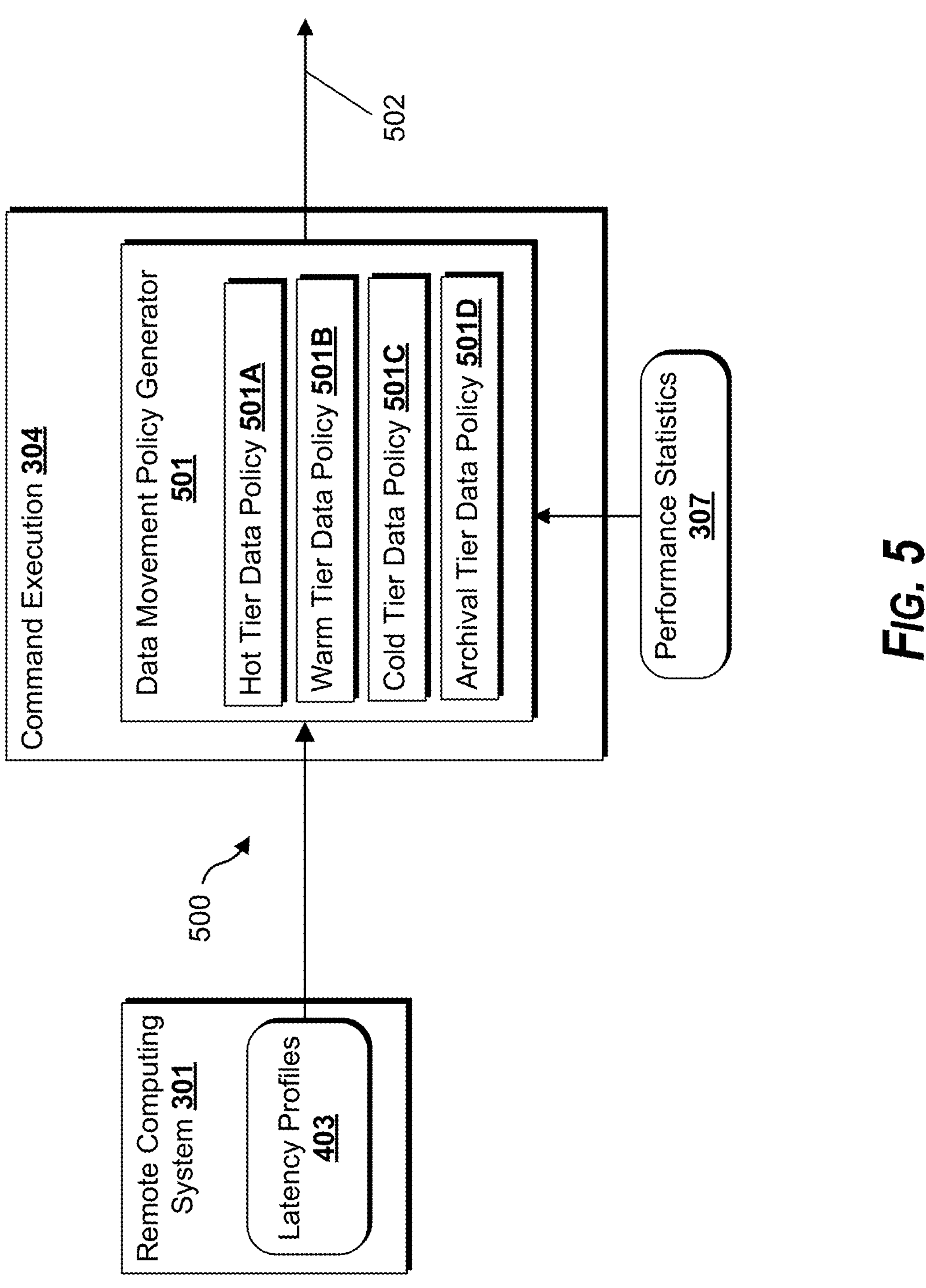
FIG. 5 depicts an example data pipeline according to example aspects of the present disclosure.

FIG. 5 depicts an example data pipeline according to example aspects of the present disclosure. The following description of data flow pipeline 500 is described with an example implementation in which a command execution system 305 receives a plurality of latency profiles 403 and performance statistics 307 to generate one or more data movement policies (e.g., hot tier data policy 501A, warm tier data policy 501B, cold tier data policy 501C, archival tier data policy 501D). In some examples, the command execution system 304 may include a data movement policy generator 501 configured to receive the performance statistics 307 and generate the one or more data movement policies 502 indicative of one or more policies that automatically update parameters to adjusts a percentage of data being classified in a first data tier to being reclassified in a second data tier. For example, the performance statistics 307 may indicate that an adjustment to one or more parameters has been made more than once. For instance, the output 405 may be applied to the buffer table 402 and the updated parameters may be applied to the data tiers. In some examples the updated parameters may be reflected in the performance statistics 307. In some examples, the data movement policies 502 may be received by the buffer table 402 and the buffer table 402 may apply the data movement policies to automatically make adjustments to one or more parameters.

In some examples, the data tiering model 401 may include a data movement policy generator 501. The data movement policy generator 501 may include a machine learned data movement policy generator trained to generate one or more data movement policies based on performance statistics 307 and latency profiles 403. For instance, the data movement policy generator 501 may utilize the patterns or occurrences of adjustments to one or more parameters to generate one or more data movement policies.

The data movement policy generator 501 may be or may otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

The data movement policy generator 501 may be trained through the use of one or more model trainers and training data. The model trainers may be trained using one or more training or learning algorithms. One example training technique is backwards propagation of errors. In some examples, simulations may be implemented for obtaining the training data or for implementing the model trainer(s) for training or testing the model(s). In some examples, the model trainer(s) may perform supervised training techniques using training latency profile, training requests, or training performance statistics. As further described herein, the training data may include test latency profiles, simulated requests, and simulated performance statistics. For instance, the training data may include simulated training data (e.g., training data obtained from simulated scenarios, inputs, configurations, test storage environments, etc.).

Additionally, or alternatively, the model trainer(s) may perform unsupervised training techniques using production training data. By way of example, the model trainer(s) may train one or more components of a machine-learned model to perform data signal processing through unsupervised training techniques using an objective function (e.g., costs, rewards, heuristics, constraints, etc.). In some implementations, the model trainer(s) may perform a number of generalization techniques to improve the generalization capability of the model(s) being trained. Generalization techniques include weight decays, dropouts, or other techniques.

In some examples, the data movement policy generator 501 may process the plurality of latency profiles 403 and the performance statistics 307 to determine one or more data movement policies. Data movement policies may include a set of rules or conditions that may be applied to the plurality of data tiers. For instance, the data movement policies may aggregate the instances of adjustments made to one or more parameters of the data tiers to satisfy the plurality of latency profiles 403. In some examples, the data movement policy generator 501 may determine, based on the performance statistics 307 and the latency profiles, that the default parameters should be updated to reflect updated default parameters.

By way of example, the data movement policy generator 501 may determine that the plurality of latency profiles 403 profiles data associated with 80 requests per minute as critical and data associated with 40 requests per minute as non-critical. In some examples, the data tiering model 401 may set default parameters to classify 10% of data with the hot data tier and classify 80% of in a warm data tier based on receiving requests 104 that satisfy the respective profiles. In some examples, the data movement policy generator 501 may determine that the data tier model frequently updates parameters to classify 40% of data in a hot data tier and 15% of data in a warm data tier due to fluctuations in requests. In some examples, the data movement policy generator 501 may determine that the default parameters should be adjusted to classify 40% of data in the hot data tiers and 15% of data in the warm data tiers. For instance, the data movement policy generator 501 may determine a threshold number of adjustments has been made to adjust the parameters to 40% and 15% respectively. In some examples, the data movement policy generator 501 may determine the performance of the storage system 302 is higher when the parameters have been adjusted to 40% and 15% respectively. In other examples, the latency profiles 403 may be adjusted to indicate default parameters of classifying 40% of data in a hot data tier and 15% of data in a warm data tier.

For example, a storage administrator may be alerted to occurrences of capacity or performance issues within the storage system 302 by the storage monitoring system 303. In some examples, the storage administrator may notify the application owner or custodian of the microservice of the performance issues resulting from the default parameters implemented to satisfy the plurality of latency profile 403. In some examples, the latency profiles 403 may be updated (e.g., updating the configuration file). In some examples, the updated latency profiles 403 may be reflected as updated parameters. In some examples, the data movement policy generator 501 may generate data movement policies indicative of the update default parameters. For instance, the data movement policy generator 501 may generate a plurality of data movement policies that reverts to the default parameters as a steady state (e.g., stable storage environment).

In some examples, the data movement policy generator 501 may generate a plurality of data movement policies based on performance statistics 307 which indicate a pattern of parameter adjustments. By way of example, the performance statistics 307 may indicate that adjustments to one or more parameters to increase a percentage of data classified in a cold data tier and decrease a percentage of data classified in an archival data tier occur frequently around holiday seasons. For instance, archived data may be accessed more frequently during the holiday seasons to provide promotional data or historical data for a microservice. In some examples, the data movement policy generator 501 may generate a cold tier data movement policy 501C and an archival tier data policy 501D to automatically increase the percentage of data classified in a cold data tier and decrease the percentage of data classified in an archival data tier. In some examples, the cold tier data movement policy 501C and archival tier data policy 501D may prevent the need for the data tiering model 401 to generate output 404 indicative of the one or more parameter adjustments.

In some examples, the data movement policies may be associated with a configuration for the plurality of data tiers. For instance, the data movement policy generator 501 may generate a hot tier data policy 501A and a warm tier data policy 501B to increase the queue depths of the hot data tier and the warm data tier to 4 queue depths respectively. For example, the performance statistics 307 may indicate that the storage system 302 optimally performs when the hot data tier and warm data tiers maintain a queue depth of 4 respectively. In some examples, the data movement policy generator 501 may generate a hot tier data policy 501A and a warm tier data policy 501 to configure the data tiers to maintain a queue depth of 4. In some examples, the hot tier data policy 501A and warn tier data policy 501B may be associated with default parameters. For instance, an initial default parameter may have indicated the hot data tiers and warm data tiers may scale queue depths between 2 and 4 queue depths. In some examples, the hot tier data policy 501A and warn tier data policy 501B may indicate an updated default parameter that configures the data tiers to maintain a queue depth of 4.

Returning to FIG. 5, the data movement policy generator 501 may generate a plurality of data movement policies and output 502 the data movement policies to the processors and storage devices of the storage system 302. For instance, the output 502 may be received by the buffer table 402 and the buffer table 402 may apply the data movement policies to the plurality of data tiers. In some examples, the output 502 may be received by a controller node of a storage cluster (e.g., storage clusters 103A, 103B, 103C) and the data movement policies may be applied to the storage nodes.

In some examples, the data movement policy generator 501 may iteratively update and generate the data movement policies. For instance, the data movement policy generator 501 may determine, based on performance statistics 307 and latency profiles 403 that the data movement policies are no longer effective. By way of example, the performance statistics 307 may indicate that the cold tier data policy 501C consistently causes performance issues when applied to the cold data tier. For instance, the data tiering model 401 may update the parameters to negate a data movement policy which is failing to satisfy the plurality of latency profiles 403. In some examples, the data movement policy generator 501 may generate an updated data movement policy which incorporates the adjustments to negate the cold tier data policy 501C. In some examples, the updated cold tier data policy 501C may satisfy the plurality of latency profiles 403.

Figure 6:
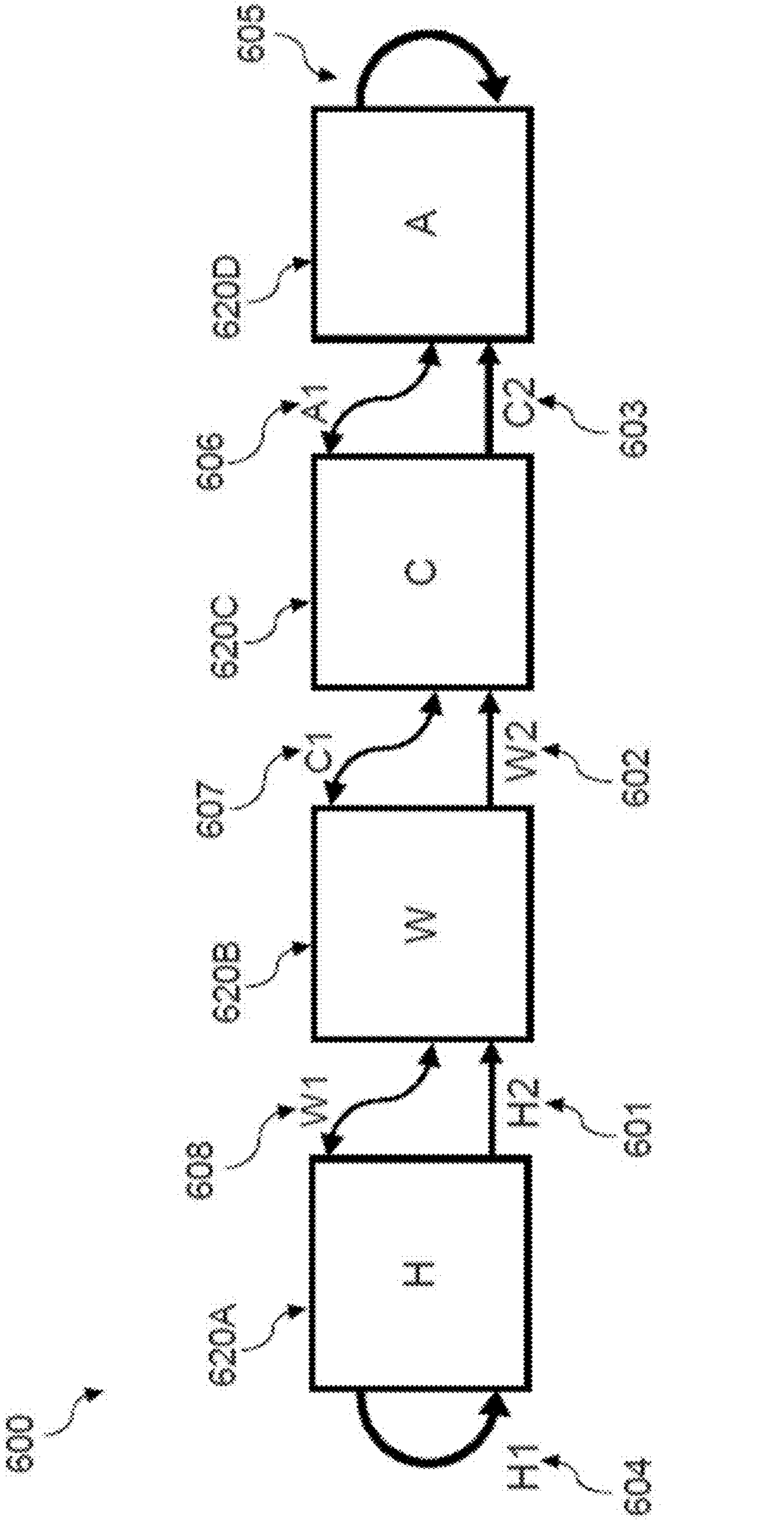
FIG. 6 depicts example data movement according to example aspects of the present disclosure.

FIG. 6 depicts an example data movement according to example aspects of the present disclosure. The example data movement 600 may include a hot data tier 620A, warm data tier 620B, cold data tier 620C, and an archival data tier 620D. In some examples, the example data movement 600 may be the result of a controller node 204 orchestrating the processing of requests 104 and executing commands. For instance, the hot data tier 620A, warm data tier 620B, cold data tier 620C, and an archival data tier 620D may include one or more servers and one or more processors which may process requests 104 with varying levels of latency.

In some examples, the hot tier processor 620 may include the fastest processors among the plurality of data tiers and may produce the lowest latency. In some examples, the warm data tier 620B may include the slower processors than the hot data tier 620 and may produce a higher latency than the hot data tier 620A. In some examples, the cold data tier 620C may include slower processors than the hot data tier 620A and the warm data tier 620B and produce a higher latency than the hot data tier 620A and the warm data tier 620B. In some examples, the cold data tier 620D may include the slowest processors and may produce the highest latency among the plurality of data tiers.

In some examples, the hot data tier 620A, warm data tier 620B, cold data tier 620C, and archival data tier 620B may be associated with parameters that determine the percentage of data that is reclassified in the respective data tier and the percentage of data that is reclassified from one data tier to another data tier. For example, the hot data tier 620A may include a first hot tier parameter 604 that determines the percentage of data which is classified in the hot data tier 620A and a second hot tier parameter 602 that determines the percentage of data that is reclassified from the hot data tier 620A to the warm data tier 620B. In some examples, the first hot tier parameter 604 may be the default parameter for the hot data tier 620A. In some examples, the second hot tier parameter 601 may be an adjusted parameter produced by the data tiering model 401 or a data movement policy. In some examples, both the first hot tier parameter 604 and second hot tier parameter 601 may be default parameters. In other examples, both the first hot tier parameter 604 and second hot tier parameter 601 may be adjusted parameters produced by the data tiering model 401 or a data movement policy.

In some examples, the percentage of warm data 608 which is reclassified as a result of the first hot tier parameter 604 and second hot tier parameters 601 may be reclassified by the updating of the buffer table 402. In some examples the percentage of warm data 608 which is reclassified as a result of the first hot tier parameter 604 and second hot tier parameters 601 may be reclassified by dynamically associating the storage devices 305 associated with the hot data tier 320A and the warm data tiers 320B. In other examples, the percentage of warm data 608 which is reclassified as a result of the first hot tier parameter 604 and second hot tier parameters 601 may reclassify future requests 104 received by the storage system 302.

In some examples, the warm data tier 620B and cold data tier 620C may be associated with one or more parameters which determine the percentage of data reclassified in another data tier. For example, the warm data tier 620B may be associated with a warm data tier parameter 602 that determines the percentage of data reclassified in the warm data tier 320A to the cold data tier 620C. In some examples, the percentage of warm data 607 which is reclassified as a result of the warm data tier parameter 602 may be reclassified by the updating of the buffer table, data movement policies or association of processors and storage devices 305. In some examples, the cold data tier 320C may include cold data tier parameter 603 which determines the percentage of data reclassified in the cold data tier 320C to the archival data tier 620D. In some examples, the percentage of warm data 606 which is reclassified as a result of the cold data tier parameter 603 may be reclassified by the updating of the buffer table, data movement policies or association of processors and storage devices 305.

In some examples, the archival storage tier 620D may include a cold data tier parameter 605 that determines the percentage of data which is classified in the cold data tier 620D. In some examples, the cold data tier parameter 605 may be the default parameter for the cold data tier 620D. In some examples, the cold data tier parameter 605 may be an adjusted parameter produced by the data tiering model 401 or a data movement policy. In some examples, the cold data tier parameters 605 may be adjusted parameters produced by the data tiering model 401 or a data movement policy.

In some implementations, the example data movement 600 may be implemented by the command execution system 304 within the storage system 302. For instance, the data tiering model 401 may utilize latency profiles 403, requests 104 and performance statistics 307 to update one or more parameters (e.g., first hot data tier parameters 604, second hot data tier parameters 601, warm data tier parameters 602, 603 cold data tier parameters, 605 archival data tier parameters).

In some implementations, the example data movement 600 may be implemented by a using one or more containers (e.g., standalone software package for a software application) using a container service, or on VMs (virtual machines) within a shared network. For instance, the hot data tier 620A, warm data tier 620B, cold data tier 620C, and archival data tier 620D may be associated with servers, processors, or storage devices. In some examples, the hot data tier 620A, warm data tier 620B, cold data tier 620C, and archival data tier 620D may be implemented across a plurality of storage nodes within a storage cluster (e.g., storage clusters 103A, 103B, 103C). In some examples, the hot data tier 620A, warm data tier 620B, cold data tier 620C, and archival data tier 620D may be deployed across a plurality of storage cluster (e.g., storage clusters 103A, 103B, 103C).

In some examples, the orchestration of data movement 600 may be implemented by a controller node (e.g., controller node 204) within a storage cluster (e.g., storage clusters 103A, 103B, 103C). In some examples, the orchestration of data movement 600 may be implemented by the command execution system 304 within the storage system.

Figure 7:
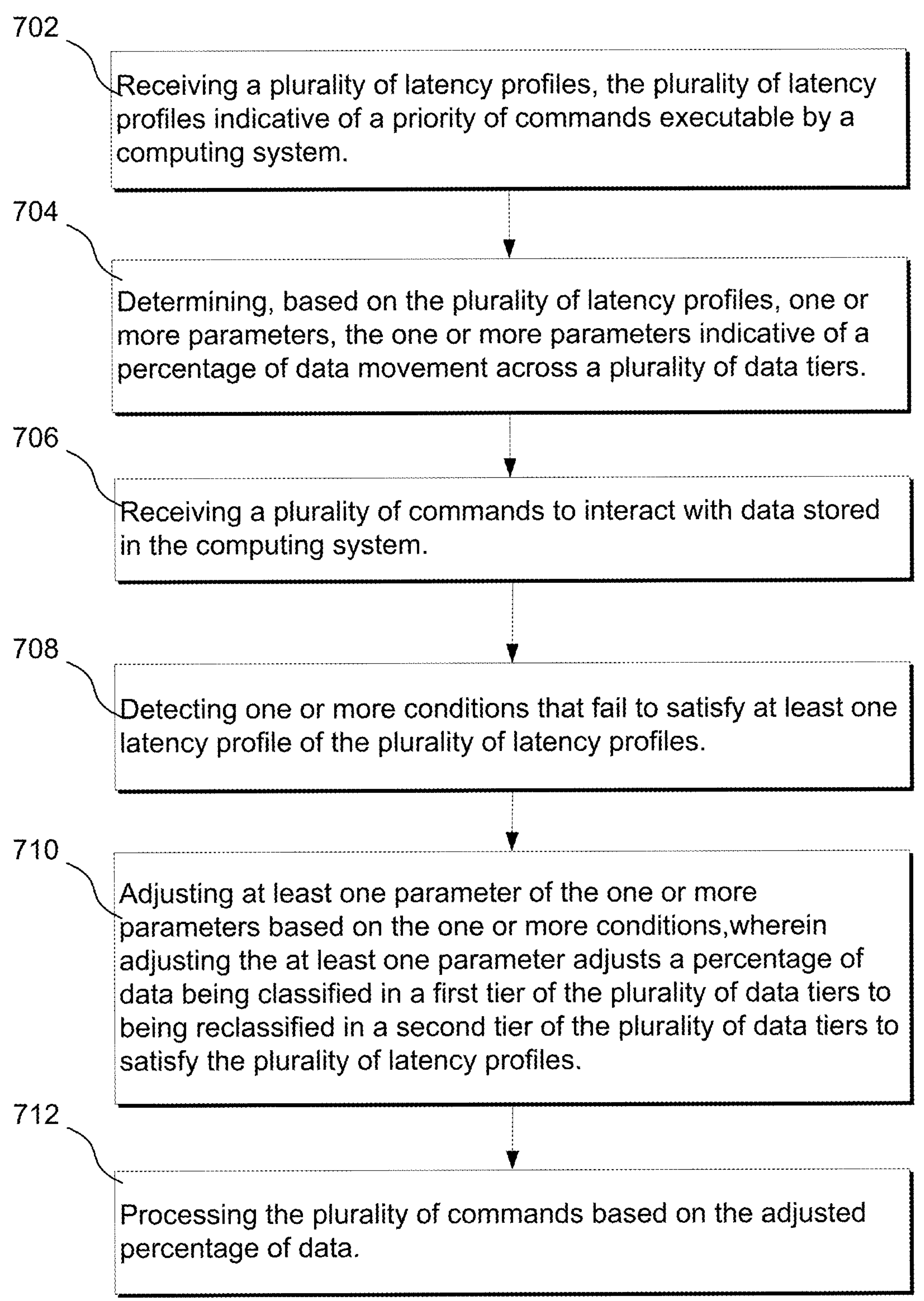
FIG. 7 depicts a flowchart diagram of an example method according to example aspects of the present disclosure.

FIG. 7 depicts a flowchart diagram of an example method according to example aspects of the present disclosure. One or more portion(s) of the method 700 may be implemented by one or more computing devices such as, for example, the computing devices/systems described in FIGS. 3, 4, 5, etc. Moreover, one or more portion(s) of the method 700 may be implemented as an algorithm on the hardware components of the device(s) described herein. For example, a computing system may include one or more processors and one or more non-transitory, computer-readable media storing instructions that are executable by the one or more processors to cause the computing system to perform operations, the operations including one or more of the operations/portions of method 700. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure.

In an embodiment, the method 700 may include a step 702 or otherwise begin by receiving a plurality of latency profiles, the plurality of latency profiles indicative of a priority of commands executable by a computing system. For example, the remote computing system 301 may transmit latency profiles 403 to the data tiering model 401. Latency profiles 403 may include data indicating a plurality of latency requirements for data associated with an application or one or more microservices. For instance, latency profiles 403 may be defined by an application owner or custodian of a microservice. In some examples, latency profiles 403 may include a configuration file which defines requirements for specific types of data associated with the application or microservice. In some examples, the configuration file may specify latency thresholds or requirements which must be satisfied to prevent performance issues within the application or microservice. In some examples, latency profiles 403 may be provided to the command execution system 304 during initial deployment or implementation of the application or microservice. For instance, providing the latency profiles 403 during initial deployment may prevent any performance or latency related issues when the application or microservice moves into production.

In an embodiment, the method 700 may include a step 704 or otherwise continue by determining, based on the plurality of latency profiles, one or more parameters, the one or more parameters indicative of a percentage of data movement across a plurality of data tiers. For example, the command execution system 304 may set default parameters for movement of data to satisfy the plurality of latency profiles 403. For example, the default parameters may be associated with the movement of data defined by the plurality of latency profiles 403. By way of example, the plurality of latency profiles 403 may indicate a movement of data across the plurality of data tiers based on a threshold time where the data has not been accessed. For instance, data which has not been accessed (e.g., no associated requests 104) in the last 30 seconds may tolerate a higher latency than data which is being accessed (e.g., associated with a request 104) every 5 seconds. In some examples, the latency profiles 403 indicating the threshold time of interactions may be applied as default parameters for classifying data associated with requests 104 in a respective data tier.

In some examples, the command execution system 304 may set default parameters for movement of data to satisfy the plurality of latency profiles 403. For example, the default parameters may be associated with the movement of data defined by the plurality of latency profiles 403. By way of example, the plurality of latency profiles 403 may indicate a movement of data across the plurality of data tiers based on a threshold time where the data has not been accessed. For instance, data which has not been accessed (e.g., no associated requests 104) in the last 30 seconds may tolerate a higher latency than data which is being accessed (e.g., associated with a request 104) every 5 seconds. In some examples, the latency profiles 403 indicating the threshold time of interactions may be applied as default parameters for classifying data associated with requests 104 in a respective data tier.

In some examples, default parameters may include one or more rules for assigning (e.g., queuing) a request 104 to a respective processor (e.g., hot tier processors 308, warm tier processors 309, cold tier processors 310, archival tier processors 311) to be executed. For instance, default parameters may include rules for queueing a command in a buffer table that assign the command to a storage node (e.g., data tier) which includes processing resources sufficient to process the command. In some examples, default parameters may include processing resources. For instance, default parameters may include assigning sufficient queue depths. Queue depths may indicate the number of requests 104 (e.g., commands) which may be executed in parallel by the processors. In some examples, the queue depths may vary based on the processors (e.g., data tier). For instance, hot tier processors 308 may be associated with a hot data tier and include queue depths that may only process 32 commands per queue. For instance, in order to maintain a low latency, the number of commands per queue may be reduced.

In some examples, the default parameters may satisfy the plurality of latency profiles 403. For instance, the default parameters may define the rules for assigning requests 104 to data tiers and include sufficient resources to maintain the integrity of the latency profiles in a stable environment. In some examples, the storage system 302 may not maintain a stable environment. For instance, the storage system 302 may experience a data outage in the primary region where the storage system 302 is located. In some examples, the storage system 302 may experience failover and need to sever requests from a second data center which has replicated the storage system 302. In some examples, the routing of requests to the second data center may introduce an unstable environment. In some examples, the default parameters may need to be updated to maintain the plurality of latency profiles 403.

In an embodiment, the method 700 may include a step 706 or otherwise continue by receiving a plurality of commands to interact with data stored in the computing system. For example, the data tiering model 401 may receive a plurality of requests 104 to interact with data within the storage system 302 from the remote computing system 301. For instance, the requests 104 may be transmitted via an API. In some examples, the requests 104 may be associated with data which has been profiled by the latency profiles 403. For instance, requests 104 may include a request to interact with critical data, periodically critical data, non-critical data, etc. In some examples, the latency profiles 403 may indicate a latency requirement for the data associated with the request 104. In some examples, the latency requirements defined by the latency profiles 403 may indicate a respective data tier.

In an embodiment, the method 700 may include a step 708 or otherwise continue by detecting one or more conditions that fail to satisfy at least one latency profile of the plurality of latency profiles. For instance, the data tiering model 401 may process the plurality of latency profiles 403, requests 104, and performance statistics 307 and detect one or more conditions that fail to satisfy at least one latency profile 403. For example, the data tiering model 401 may determine that one or more default parameters require adjustments based on the latency requirements defined by the plurality of latency profiles 403, the data associated with the requests 104, and the performance statistics 307.

By way of example, the performance statistics 307 may indicate that one or more default parameters classify 15% of requests 104 associated user data in a hot data tier due to 15% of user data typically experiencing 100 requests per minute and 25% of requests 104 associated with user data in a warm data tier due to 25% of user data typically experiencing 50 requests 104 per minute. In some examples, the plurality of latency profiles 403 may indicate that data which is requested at least 100 times per minute requires a latency associated with a hot data tier and data which is requested at least 50 times per minute may tolerate a latency associated with a warm data tier.

In some examples, the data tiering model 401 may determine, based on the performance statistics 307, that 45% of user data is experiencing 100 requests per minute and 10% of user data is experiencing 50 requests per minute. In some examples, the data tiering model 401 may determine that default parameters which classify 15% of requests 104 associated with user data in a hot data tier and 25% in a warm data tier will not satisfy the plurality of latency profiles 403. For instance, 10% of user data assigned to the warm tier which is requested 100 times per minute may not experience a latency (e.g., 50 milliseconds or less) associated with a hot data tier despite experiencing 100 requests per minute. In some examples, the data tiering model 401 may determine that one or more parameters may be adjusted to satisfy the plurality of latency profiles 403.

In an embodiment, the method 700 may include a step 710 or otherwise continue by adjusting at least one parameter of the one or more parameters based on the one or more conditions, wherein adjusting the one or more parameters adjusts the percentage of data movement across the plurality of data tiers to satisfy the plurality of latency profiles. For instance, the data tiering model 401 may adjust one or more parameters and output 404 data indicative of the updated parameters. In some examples, the buffer table 403 may receive the output 404 and apply the updated parameter. For example, the buffer table 402 may receive all commands (e.g., write commands 201) to interact with data blocks stored across the storage system 302. For instance, the buffer table 402 may be associated with a queue of commands (e.g., requests) received by the storage 302 which require processing. In some examples, the buffer table 402 may include one or more controller nodes 204 for distributing the commands to the primary master nodes 205 for execution. In some examples, the buffer table 402 may indicate the processing resources of the respective primary master nodes 205. In some examples, the controller nodes may allocate additional resources to the primary master nodes 205 and balance the computing resources across the storage cluster 103A, 103B, 103C.

In some examples, the buffer table 402 may apply the output 404 and update the buffer table 402 to reflect the updated parameters. In some examples, applying the updated parameters may reclassify requests 104 which have not yet been processed. For instance, a first data tier may include a queue of 400 commands to execute and the buffer table 402 may apply the output 404 to reclassify 100 of the commands to a second data tier to execute. In some examples, applying the output 404 may include applying the updated parameters to future requests 104. For instance, commands which have already been classified may be processed, and the percentage of data indicated by the updated parameters may be applied to requests that are subsequently received.

In some examples, the buffer table may apply the output 404 and update the association of storage devices and processors. For instance, the updated parameters may indicate that data which is stored in archival tier storage 320D may need to be accessed more frequently and should be associated with cold tier processors 310. For instance, a onetime promotional code which is archived and stored in archival tier storage 320D may be reused for a current promotion. In some examples, the one or more storage devices within the archival tier storage 320D may be associated with the cold tier processors 310 to allow for interactions that satisfy the latency profile 403 associated with the cold data tier. In other examples, data may be replicated from storage tier storage to cold tier storage to allow for easier interactions with the data.

In an embodiment, the method 700 may include a step 712 or otherwise continue by processing the plurality of commands based on the adjusted percentage of data. For instance, the buffer table may output 405 the updated parameters to the plurality of processors and storage devices. For example, the updated queue of commands may be processed by the hot tier processors 308, warm tier processors 309, cold tier processors 310, and archival tier processors 311. In some examples, the output 405 may reflect the adjusted percentage of data classified in the respective data tiers. In some examples, the output 405 may reclassify the storage devices 305 to reflect the adjusted percentage of data classified in the respective data tiers.

In some examples, the data tiering model 401 may determine one or more patterns of adjusting the one or more parameters. For example, the data tiering model 401 may adjust one or more parameters to adjust a percentage of data being classified in a first data tier to being reclassified in a second data tier for a temporary period of time and readjust the one or more parameters back to the default parameters. In some examples, the data tiering model 401 may adjust the one or more parameters and determine the default parameters will no longer satisfy the plurality of latency profiles 403 and maintain the adjusted parameters. In other examples, the data tiering model 401 may determine one or more data movement policies that reflect the dynamic and statics patterns of adjusting the one or more parameters and apply the data movement policies to the data tiers to automatically adjust the one or more parameters given one or more conditions.

Figure 8:
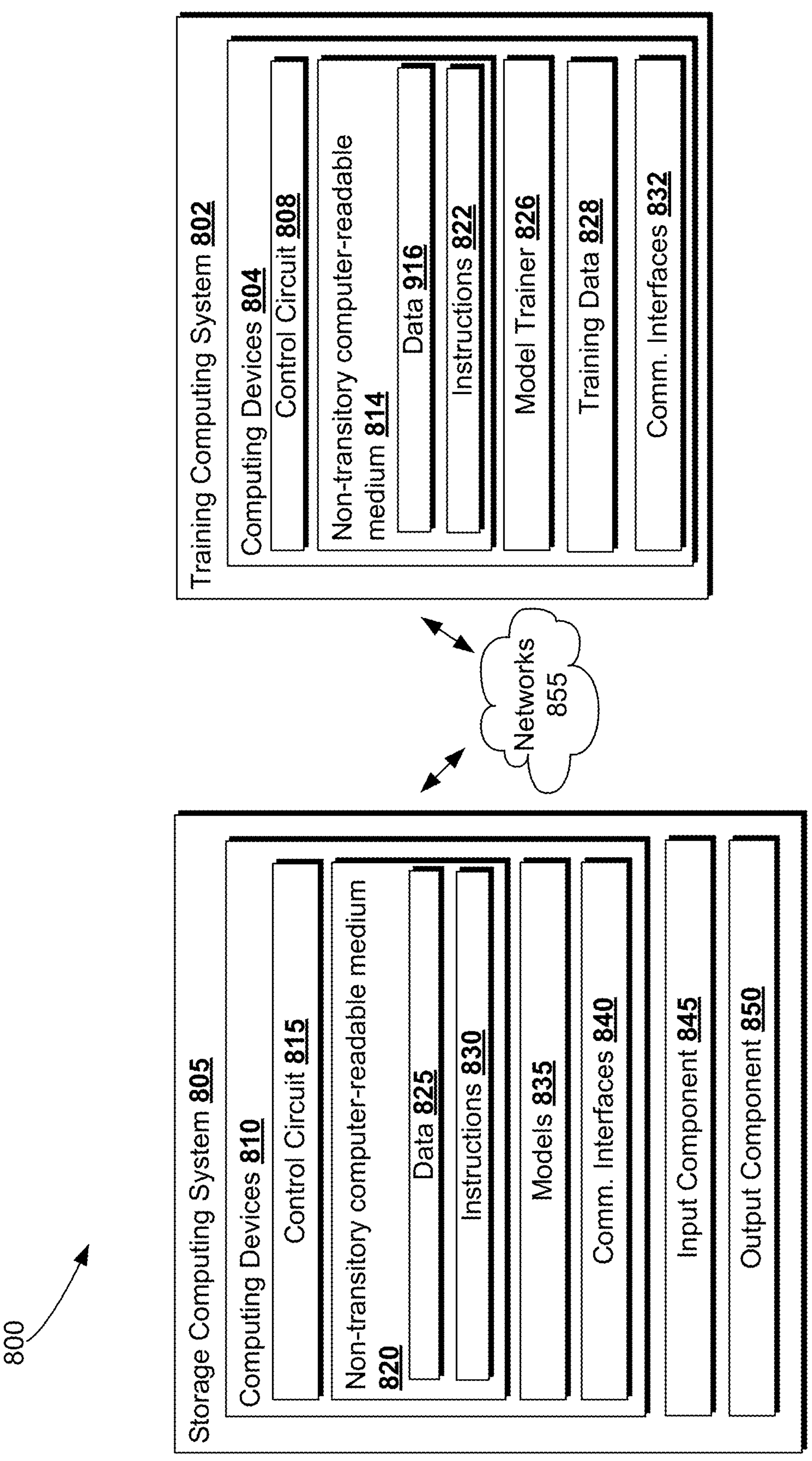
FIG. 8 depicts an example computing ecosystem according to example aspects of the present disclosure.

FIG. 8 depicts a block diagram of an example system 800 for implementing systems and methods according to example embodiments of the present disclosure. The system 800 includes a storage computing system 805 (e.g., storage system 300), and a training computing system 802 communicatively coupled over one or more networks 855.

The storage computing system 805 may include one or more computing devices 810 or circuitry. For instance, the storage computing system 805 may include a control circuit 815 and a non-transitory computer-readable medium 820, also referred to herein as memory. In an embodiment, the control circuit 815 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 915 may be programmed by one or more computer-readable or computer-executable instructions stored on the non-transitory computer-readable medium 820.

In an embodiment, the non-transitory computer-readable medium 820 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 820 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 820 may store information that may be accessed by the control circuit 815. For instance, the non-transitory computer-readable medium 820 (e.g., memory devices) may store data 825 that may be obtained, received, accessed, written, manipulated, created, and/or stored. The data 825 may include, for instance, any of the data (e.g., log data) or information described herein. In some implementations, the storage computing system 805 may obtain data from one or more memories that are remote from the storage computing system 805.

The non-transitory computer-readable medium 820 may also store computer-readable instructions 830 that may be executed by the control circuit 815. The instructions 830 may be software written in any suitable programming language or may be implemented in hardware.

The instructions 830 may be executed in logically and/or virtually separate threads on the control circuit 815. For example, the non-transitory computer-readable medium 820 may store instructions 830 that when executed by the control circuit 815 cause the control circuit 815 to perform any of the operations, methods and/or processes described herein. In some cases, the non-transitory computer-readable medium 820 may store computer-executable instructions or computer-readable instructions, such as instructions to perform at least a portion of the methods of FIG. 7.

In an embodiment, the storage computing system 805 may store or include one or more machine-learned models 835. For example, the machine-learned models 835 may be or may otherwise include various machine-learned models. In an embodiment, the machine-learned models 835 may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. In an embodiment, the storage computing system 805 may implement multiple parallel instances of a single model.

The storage computing system 805 may include one or more communication interfaces 840. The communication interfaces 840 may be used to communicate with one or more other systems. The communication interfaces 840 may include any circuits, components, software, etc. for communicating via one or more networks (e.g., networks 855). In some implementations, the communication interfaces 840 may include for example, one or more of a communications controller, receiver, transceiver, transmitter, port, conductors, software and/or hardware for communicating data/information.

The storage computing system 805 may also include one or more user input components 945 that receives user input. For example, the user input component 845 may be a touch-sensitive component (e.g., a touch-sensitive user interface of a mobile device) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The storage computing system 805 may include one or more output components 850. The output components 850 may include hardware and/or software for audibly or visually producing content. For instance, the output components 850 may include one or more speakers, earpieces, headsets, handsets, etc. The output components 850 may include a display device, which may include hardware for displaying a user interface and/or messages for a user. By way of example, the output component 850 may include a display screen, CRT, LCD, plasma screen, touch screen, TV, projector, tablet, and/or other suitable display components.

The storage computing system 805 may train the models 835 via interaction with the training computing system 802 that is communicatively coupled over the networks 855. The training computing system 802 may be separate from the storage computing system 801 or may be a portion of the storage computing system 801.

The training computing system 802 may include one or more computing devices 804. In an embodiment, the training computing system 802 may include or is otherwise implemented by one or more server computing devices. In instances in which the training computing system 802 includes plural server computing devices, such server computing devices may operate according to sequential computing architectures, parallel computing architectures, or some combination thereof.

The training computing system 802 may include a control circuit 808 and a non-transitory computer-readable medium 814, also referred to herein as memory 814. In an embodiment, the control circuit 808 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 808 may be programmed by one or more computer-readable or computer-executable instructions stored on the non-transitory computer-readable medium 814.

In an embodiment, the non-transitory computer-readable medium 814 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 814 may store information that may be accessed by the control circuit 815. For instance, the non-transitory computer-readable medium 814 (e.g., memory devices) may store data 816 that may be obtained, received, accessed, written, manipulated, created, and/or stored. The data 816 may include, for instance, any of the data (e.g., data logs) or information described herein. In some implementations, the training computing system 802 may obtain data from one or more memories that are remote from the training computing system 802.

The non-transitory computer-readable medium 814 may also store computer-readable instructions 822 that may be executed by the control circuit 808. The instructions 822 may be software written in any suitable programming language or may be implemented in hardware. The instructions may include computer-readable instructions, computer-executable instructions, etc.

The instructions 822 may be executed in logically or virtually separate threads on the control circuit 808. For example, the non-transitory computer-readable medium 814 may store instructions 822 that when executed by the control circuit 808 cause the control circuit 808 to perform any of the operations, methods and/or processes described herein. In some cases, the non-transitory computer-readable medium 814 may store computer-executable instructions or computer-readable instructions, such as instructions to perform at least a portion of the methods of FIG. 7.

The training computing system 802 may include a model trainer 826 that trains the machine-learned models 835 stored at the storage computing system 805 using various training or learning techniques. For example, the model 835 may be trained using a loss function. By way of example, for training data tiering model, the model trainer 826 may use a loss function. For example, a loss function can be back-propagated through the model(s) 835 to update one or more parameters of the model(s) 835 (e.g., based on a IOPS or throughput measurement of the loss function). Various loss functions can be used such as mean squared error, likelihood loss, cross entropy loss, hinge loss, and/or various other loss functions. IOPS or throughput measurement descent techniques can be used to iteratively update the parameters over a number of training iterations.

The model trainer 826 may train the models 835 in an unsupervised fashion. As such, the models 835 may be effectively trained using computer generated data for particular applications or problem domains, which improves performance and adaptability of the models 835.

The training computing system 802 may modify parameters of the models 835 (e.g., the machine-learned model 400) based on the loss function such that the models 835 may be effectively trained for specific applications in an unsupervised manner without IPOS or throughput data.

The model trainer 826 may utilize training techniques, such as backwards propagation of errors. For example, a loss function may be backpropagated through a model to update one or more parameters of the models (e.g., based on a compression ratio of the loss function). Various loss functions may be used such as mean squared error, likelihood loss, cross entropy loss, hinge loss, and/or various other loss functions. IOPS or throughput descent techniques may be used to iteratively update the parameters over a number of training iterations.

In an embodiment, performing backwards propagation of errors may include performing truncated backpropagation. The model trainer 826 may perform a number of generalization techniques (e.g., weight decays, dropouts, etc.) to improve the generalization capability of a model being trained. In particular, the model trainer 826 may train the machine-learned models 835 based on a set of training data 828.

The training data 828 may include computer generated training data for training in an unsupervised fashion. In an example, the training data 828 may include computer generated IOPS and throughput measurements generated by the models 835. The training data 828 may be specific to a data set to help focus the models 835 on optimizing IOPS and throughput.

The model trainer 826 may include computer logic utilized to provide desired functionality. The model trainer 826 may be implemented in hardware, firmware, and/or software controlling a general-purpose processor. For example, in an embodiment, the model trainer 826 may include program files stored on a storage device, loaded into a memory and executed by one or more processors. In other implementations, the model trainer 826 may include one or more sets of computer-executable instructions that are stored in a tangible computer-readable storage medium such as RAM, hard disk, or optical or magnetic media.

The training computing system 802 may include one or more communication interfaces 932. The communication interfaces 832 may be used to communicate with one or more other systems. The communication interfaces 832 may include any circuits, components, software, etc. for communicating via one or more networks (e.g., networks 855). In some implementations, the communication interfaces 832 may include for example, one or more of a communications controller, receiver, transceiver, transmitter, port, conductors, software and/or hardware for communicating data/information.

The one or more networks 855 may be any type of communications network, such as a local area network (e.g., intranet), wide area network (e.g., Internet), or some combination thereof and may include any number of wired or wireless links. In general, communication over a network 855 may be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 8 illustrates one example computing system that may be used to implement the present disclosure. Other computing systems may be used as well. For example, in an embodiment, the storage computing system 805 may include the model trainer 826 and the training data 828. In such implementations, the models 835 may be both trained and used locally at the storage computing system 805. In some of such implementations, the storage computing system 805 may implement the model trainer 826 to personalize the models 835.

Computing tasks discussed herein as being performed at certain computing device(s)/systems may instead be performed at another computing device/system, or vice versa. Such configurations may be implemented without deviating from the scope of the present disclosure. The use of computer-based systems allows for a great variety of possible configurations, combinations, and divisions of tasks and functionality between and among components. Computer-implemented operations may be performed on a single component or across multiple components. Computer-implemented tasks or operations may be performed sequentially or in parallel. Data and instructions may be stored in a single memory device or across multiple memory devices.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein may be implemented using a single device or component or multiple devices or components working in combination. Databases and applications may be implemented on a single system or distributed across multiple systems. Distributed components may operate sequentially or in parallel.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. The term "or" and "and/or" may be used interchangeably herein. Lists joined by a particular conjunction such as "or," for example, may refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims discussed herein may be adapted, rearranged, expanded, omitted, combined, or modified in various ways without deviating from the scope of the present disclosure. Some implementations are described with a reference numeral, for example illustrated purposes and are not meant to be limiting.

What is claimed is:

1. A computer-implemented method comprising:

storing, in a database, a plurality of latency profiles based on a priority of commands executable by a computing system;

determining, based on the plurality of latency profiles one or more parameters indicative of an amount of data movement across a plurality of data tiers;

receiving a set of commands to interact with data stored in the computing system; and processing the set of commands according to the one or more parameters, wherein processing the set of commands includes classifying data across one or more data tiers to satisfy the plurality of latency profiles.

2. The computer-implemented method of claim 1, wherein respective latency profiles of the plurality of latency profiles are associated with one or more latency requirements for data stored in the computing system.

3. The computer-implemented method of claim 1, wherein determining the one or more parameters comprises:

processing, by a data tiering model, the plurality of latency profiles to determine data movement policies, the data movement policies configured to move data across the plurality of data tiers according to the one or more parameters.

4. The computer-implemented method of claim 3, further comprising:

adjusting, by the data tiering model, at least one parameter of the one or more parameters, wherein adjusting the at least one parameter modifies an input/output operations per second (IOPS) of the computing system.

5. The computer-implemented method of claim 1, wherein processing the set of commands comprises retrieving the data from at least one data tier of the one or more data tiers.

6. The computer-implemented method of claim 1, wherein classifying the data across the one or more data tiers comprises assigning the data to a data tier of the one or more data tiers.

7. The computer-implemented method of claim 1, wherein a first data tier of the one or more data tiers comprises faster processors to process the set of commands than a second data tier of the one or more data tiers.

8. A computing system comprising:

one or more processors; and one or more memory resources storing instructions executable by the one or more processors to cause the computing system to perform operations, the operations comprising:

storing, in a database, a plurality of latency profiles based on a priority of commands executable by a computing system;

determining, based on the plurality of latency profiles, one or more parameters indicative of an amount of data movement across a plurality of data tiers;

receiving a set of commands to interact with data stored in the computing system; and processing the set of commands according to the one or more parameters, wherein processing the set of commands includes classifying data across one or more data tiers to satisfy the plurality of latency profiles.

9. The computing system of claim 8, wherein respective latency profiles of the plurality of latency profiles are associated with one or more latency requirements for data stored in the computing system.

10. The computing system of claim 8, wherein determining the one or more parameters comprises:

processing, by a data tiering model, the plurality of latency profiles to determine data movement policies, the data movement policies configured to move data across the plurality of data tiers according to the one or more parameters.

11. The computing system of claim 10, wherein the operations further comprise:

adjusting, by the data tiering model, at least one parameter of the one or more parameters, wherein adjusting the at least one parameter modifies an input/output operations per second (IOPS) of the computing system.

12. The computing system of claim 8, wherein processing the set of commands comprises retrieving the data from at least one data tier of the one or more data tiers.

13. The computing system of claim 8, wherein classifying the data across the one or more data tiers comprises assigning the data to a data tier of the one or more data tiers.

14. The computing system of claim 8, wherein a first data tier of the one or more data tiers comprises faster processors to process the set of commands than a second data tier of the one or more data tiers.

15. A non-transitory computer-readable media storing instructions that are executable by one or more processors to cause the one or more processors to perform operations, the operations comprising:

storing, in a database, a plurality of latency profiles based on a priority of commands executable by a computing system;

determining, based on the plurality of latency profiles, one or more parameters indicative of an amount of data movement across a plurality of data tiers;

receiving a set of commands to interact with data stored in the computing system; and processing the set of commands according to the one or more parameters, wherein processing the set of commands includes classifying data across one or more data tiers to satisfy the plurality of latency profiles.

16. The non-transitory computer-readable media of claim 15, wherein respective latency profiles of the plurality of latency profiles are associated with one or more latency requirements for data stored in the computing system.

17. The non-transitory computer-readable media of claim 15, wherein determining the one or more parameters comprises:

processing, by a data tiering model, the plurality of latency profiles to determine data movement policies, the data movement policies configured to move data across the plurality of data tiers according to the one or more parameters.

18. The non-transitory computer-readable media of claim 17, wherein the operations further comprise:

adjusting, by the data tiering model, at least one parameter of the one or more parameters, wherein adjusting the at least one parameter modifies an input/output operations per second (IOPS) of the computing system.

19. The non-transitory computer-readable media of claim 15, wherein processing the set of commands comprises retrieving the data from at least one data tier of the one or more data tiers.

20. The non-transitory computer-readable media of claim 15, wherein classifying the data across the one or more data tiers comprises assigning the data to a data tier of the one or more data tiers.

* * * * *